United States Patent
McEvoy et al.

(10) Patent No.: US 8,667,791 B2
(45) Date of Patent: Mar. 11, 2014

(54) DAMPER AND DAMPING STRUCTURE FOR A WAVE ENERGY CONVERSION DEVICE AND MOORING COMPONENT

(75) Inventors: Paul McEvoy, Balbriggan (IE); Robert Healy, Castlerea (IE)

(73) Assignee: Technology From Ideas, Limited, Waterford (IE)

( * ) Notice: Subject to any disclaimer, the term of this patent is extended or adjusted under 35 U.S.C. 154(b) by 1072 days.

(21) Appl. No.: 12/580,955

(22) Filed: Oct. 16, 2009

(65) Prior Publication Data

US 2010/0101474 A1   Apr. 29, 2010

Related U.S. Application Data

(63) Continuation-in-part of application No. PCT/EP2008/054740, filed on Apr. 18, 2008.

(30) Foreign Application Priority Data

Sep. 18, 2009 (EP) .................................. 09170681

(51) Int. Cl.
*F03C 1/00* (2006.01)
(52) U.S. Cl.
USPC .................. 60/497; 60/498; 60/499; 60/504; 60/505; 290/42; 290/53
(58) Field of Classification Search
USPC ................... 60/497, 498, 499, 504, 505, 506; 290/42, 53
See application file for complete search history.

(56) References Cited

U.S. PATENT DOCUMENTS

| | | | |
|---|---|---|---|
| 3,704,877 A | | 12/1972 | Nunes et al. |
| 4,421,461 A * | | 12/1983 | Hicks et al. ..................... 417/53 |
| 4,464,578 A * | | 8/1984 | Masubuchi ..................... 290/42 |
| 4,534,262 A | | 8/1985 | Swenson |
| 4,597,351 A | | 7/1986 | Brainard, II |
| 6,024,345 A | | 2/2000 | Nishio |
| 6,617,705 B1 * | | 9/2003 | Smalser et al. ................ 290/42 |
| 6,857,266 B2 | | 2/2005 | Dick |
| 6,930,406 B2 * | | 8/2005 | Montgomery .................. 290/42 |

(Continued)

FOREIGN PATENT DOCUMENTS

| | | |
|---|---|---|
| EP | 0132048 | 1/1985 |
| FR | 2501739 | 9/1982 |

(Continued)

OTHER PUBLICATIONS

"Seaflex Product Guide", Version 1.2, Jun. 21, 2004.

*Primary Examiner* — Hoang Nguyen
(74) *Attorney, Agent, or Firm* — Diederiks & Whitelaw, PLC

(57) ABSTRACT

The present invention relates to a damper for damping the reactionary motion of a wave energy conversion device to wave motion, comprising a damping energy absorber (7) having a reversible non-linear stress-strain response, arranged to damp the reactionary motion of the WEC. According to a first aspect, there is provided a damping structure (2) for a wave energy conversion device (1). The structure comprises a fixed member (6), and a damping member (7) having a reversible non-linear stress-strain response. The present invention also relates to a mooring component (2) for a mooring system (1) and to a method for manufacturing a mooring component (2). The component comprises a deformable element (6) having a reversible non-linear stress-strain response, wherein the response is a composite reversible non-linear stress-strain response.

15 Claims, 27 Drawing Sheets

(56) References Cited

U.S. PATENT DOCUMENTS

| | | | |
|---|---|---|---|
| 7,385,301 B2 * | 6/2008 | Hirsch | 290/42 |
| 2005/0103251 A1 | 5/2005 | Huang | |
| 2006/0033252 A1 | 2/2006 | Elmoselhy | |
| 2009/0202306 A1 | 8/2009 | Huang | |

FOREIGN PATENT DOCUMENTS

| | | |
|---|---|---|
| FR | 2541730 | 8/1984 |
| GB | 2002052 | 2/1979 |
| GB | 2113311 | 8/1983 |
| JP | 48082278 | 11/1973 |
| JP | 58001843 | 1/1983 |
| JP | 61184238 | 8/1986 |
| JP | 2230969 | 9/1990 |
| JP | 9226012 | 9/1997 |
| JP | 2002-002531 | 1/2002 |
| WO | WO 96/27055 | 9/1996 |
| WO | 0017519 | 3/2000 |
| WO | WO 2004/085843 | 10/2004 |
| WO | WO 2005/028139 | 3/2005 |
| WO | 2006052923 | 5/2006 |
| WO | 2007137426 | 12/2007 |

* cited by examiner

DAMPER AND DAMPING STRUCTURE FOR A WAVE ENERGY CONVERSION DEVICE AND MOORING COMPONENT

RELATED APPLICATIONS

This application is a continuation-in-part application claiming priority under 35 U.S.C. 119 and 35 U.S.C. 365(c) from European patent application no. 09170681.2, filed on Sep. 18, 2009, and PCT Application No. PCT/EP2008/054740, filed on Apr. 18, 2008, respectively.

FIELD OF THE INVENTION

The present invention relates to devices for wave energy conversion and, in particular, to a damper and a damping structure for a wave energy conversion device. The present invention also relates to the application of the damping technology to mooring components, and in particular, to mooring components suitable for mooring application where low scope and small footprint are required.

BACKGROUND TO THE INVENTION

Increasing concerns regarding traditional energy sources have prompted investigation of alternative, renewable sources of energy. Wave energy is a renewable energy source and countries with extensive coastlines and strong prevailing winds could produce considerable quantities of electricity from wave power.

Wave energy refers to the energy of ocean surface waves and the capture of that energy for the purpose of electricity generation. In general, the larger the wave, the more energy it contains, and therefore, the more energy that can be obtained from it. Specifically, the amount of energy which may be obtained from waves is determined by wave height, wave speed, wavelength, and water density.

Several types of devices may be used to capture wave energy. All of these devices work on a similar principle. The wave force acts on a moveable absorbing member, which reacts against a fixed point. The fixed point may be a land or sea-bed based structure, or another moveable, but force-resisting, structure. The wave force results in oscillatory motion of the absorbing member and the product of wave force and corresponding motion represents the converted energy.

There are several disadvantages associated with known energy absorbing devices. Extreme waves (i.e. exceptionally large waves with respect to the current wave state, or rapidly changing waves) can occur during otherwise benign wave states. Such large waves can cause an excessive force to be exerted on the linkage or coupling between the moveable member and the fixed point. This can result in breakage of the coupling, particularly in devices with no natural damping, such as linear energy converters. Accordingly, these devices have poor survivability, even in normal wave conditions. A further disadvantage associated with known wave energy converters is poor efficiency of energy capture. Typical devices are capable of capturing wave energy only over a relatively narrow range of wave frequencies and energy states. While more advanced devices can tune their response to enable them to optimize energy capture from any given wave state, such slow tuning usually only delivers a good response to the average power spectrum of that wave state. Few devices can respond rapidly enough to the individual frequencies within a single sea state.

An object of the invention is to provide a damping structure for a wave energy conversion (WEC) device that automatically counteracts or dampens any extreme wave forces. Another object of the invention is to provide a damping structure for a WEC device having improved efficiency of energy capture. A further object of the invention is to provide a damping structure for a WEC device that allows additional energy capture over a wide range of wave frequencies. A further object of the invention is to provide a damping structure for a WEC that allows the WEC to maintain an optimum alignment to the wave.

By way of background to the mooring application of this technology, it is noted that vessels and other sea-based devices such as fish farms, floating docks, oil rigs and floating wind farms are typically moored to fixed structures such as piers, quays or the seabed using mooring lines or hawsers. Wave energy conversion devices are typically moored in a similar manner.

Traditional mooring lines are usually made from synthetic materials, such as nylon or Kevlar. Typically, nylon mooring lines are quite elastic, which allows excess stress to be spread over a number of lines. However, nylon lines can only deliver small elongations of the order of 10%. Mooring lines may also be made from wire rope, which is extremely strong, but difficult to handle and maintain. Lines may also be made from a combination of wire rope and synthetic materials, in which case the line is referred to as a hawser.

However, these mooring solutions that are suitable for deep water or dock mooring are not suitable for low scope or small footprint mooring applications, where some devices, particularly renewable energy devices, need to operate. The "scope" of a mooring is the length of the mooring per unit of water depth. The "footprint" of a mooring is the seabed area occupied by the mooring. The problem lies in the relationship between the size of the waves, drift lengths and/or tidal changes, which are encountered in these environments and the inability of traditional mooring systems to flex with the forces and extension such conditions apply to the mooring, without resorting to large footprints or over-engineered solutions. Each mooring line has a finite breaking point or breaking limit. The higher the breaking limit, the greater the diameter or the higher the grade of material required, and thus the higher the cost of the mooring.

In certain environments, wave heights, drift lengths or tidal changes can easily exceed 25% of the water depth. For example, in non-sheltered ocean locations, wave heights can often exceed 10 meters in water depths of 30 to 40 meters. Tides cause changes in the depth of marine and estuarine water bodies and produce oscillating currents known as tidal streams. Tidal cycles last approximately 12 hours and 25 minutes in most locations and the tidal cycles involves the following sea level changes. Over several hours, water flows in one direction, known as flood flow, reaches a maximum height, known as high tide, and then lowers or falls off as water flows in another (not necessarily opposite) direction known as ebb tide until a low tide level is reached. Moorings system must be able to cope with this tidal turning. In tidal flow regions, that is, where a moored body is acted on by tidal streams or tidal turning, the drift forces can pull the mooring sizeable distances in one direction (horizontally) and then the other as the tide changes. In tidal barrage regions, that is, where there is a change in water depth due to tides, the tidal height can change by a few meters in shallow waters. Under any of these conditions, a mooring system needs to be flexible enough to allow for the device to ride the changes without requiring a significant footprint. Failure to achieve this results in significant loads being applied to the mooring system, which must either be designed for (which may result in overengineering of the mooring system) or the system risks breakages. The elasticity of nylon lines is not sufficient for these mooring applications, for example at a seabed depth of 30 meters, in regions where wave heights may be in the region of 10 meters.

One type of mooring used for certain applications is the catenary mooring. A catenary mooring comprises a free hanging line or cable, running horizontal to the seabed. The restoring force of the mooring line is primarily generated by the hanging weight and pretension in the line. An example of a prior art catenary mooring system is shown in FIG. 23, which illustrates that, as the water depth increases, the weight of chain acting on the floater increases and this can result in large resistive forces being exerted on the floater. Due to the horizontal load reacting nature of the conventional drag embedded anchors which are used with catenary systems, the scope of the cable must therefore be chosen such that the cable is never entirely picked up from the seabed for the given environmental conditions. As shown in FIG. 23, when the water depth is the same order of magnitude as large waves (i.e. depths of 20 m) the length of chain required to deal with changes in water depth of 40-60 m is very large. Normally a scope of three suffices, but in shallower, exposed areas scopes of more than five are frequently required. This is often inefficient and takes up a lot of seabed around the device and results in very high costs for the mooring system.

Another drawback of this type of system is that, in order to deal with large waves, the chain or cable lifts as the water depth increases and the floater moves both vertically and horizontally to a new position. Thus, a large space envelope is required to allow horizontal movement as water depths rise. This restricts both the density of floating bodies (e.g. floating platforms) that can be positioned within an area and also the accuracy to which those bodies can be positioned. A further disadvantage of the catenary system is fatigue, as the mooring lines tend to wear at the seabed touch down point.

Elastomeric mooring solutions are provided by a number of companies, including

Supflex®, Seaflex® and Hazelett Marine. The elastic properties of the Hazelett device absorb the peak loads and maintain a lower steady pull on the vessel or device. Under extreme loading, it may elongate up to 300%. The Seaflex® rubber hawser can withstand a force of drag greater than 10 kN and more than 100% elongation to allow the mooring to take care of natural and artificial water level fluctuations.

These passive elastomeric material solutions are becoming popular in near shore and dock mooring applications. They provide a number of advantages over traditional mooring solutions by allowing a flexible component in the mooring system to stretch with the heave and surge of the vessel or device. They also cause less seabed damage, as additional slackness can be built into the mooring system. However, these mooring systems are principally designed to prevent drift of vessels and are not designed to provide low scope, small footprint performance in deeper waters. These current elastomeric solutions work well where the change in height is small with respect to the depth of water in which the mooring is used, such as in-harbour pontoons, where wave heights are low with respect to water depth, and in estuaries, where tidal changes in water height are low. While they provide a natural non-linear stress strain response to applied wave forces, they do not deliver the performance and response curves required for more challenging mooring environments. In order to achieve the level of performance required for these applications, a relatively large scope, that is, length per unit of depth and a large seabed footprint are required. This means that more material, or higher-grade material, must be used, thereby increasing cost.

Typically, these elastomeric solutions comprise a multi-strand elastomeric component. The number of strands in the component may be varied in order to vary the damping response achieved. However, the response of the component to applied forces varies only in scale, and the basic response achieved remains the same. Thus, the response may only be tailored to one particular sea state or environmental loading (i.e. a fixed height to depth or current to depth ratio). In deeper of faster waters, the component is likely to snap due to excessive ratio change.

Ideally, a deep sea mooring system needs to be adaptable to the sea states at the location at which it is placed and so it must adjust to the applied forces from the waves over very short time periods. Ideally, the mooring system is self-adjusting so that risk of failure in harsh environments is reduced. Ideally, the mooring system should absorb load forces at the lowest possible breaking limit. It should also be cost-effective.

International Application Publication No. WO 96/27055 describes a hysteretic damping apparatus and method which uses one or more tension elements fabricated from shape memory alloy to cycle through a superelastic stress-strain hysteresis. The damping apparatus may be designed to have a selected stroke or force capacity by adjusting the length, thickness and number of the tension elements. The tension elements may be in the form of wire loops or bands and can be used to damp movement of structures such as offshore platforms subject to wave movement.

There are a number of disadvantages associated with this damping apparatus. First of all, this is a pure damping system which is concerned only with dissipation of energy. In a wave energy environment, this device would very quickly overheat and would be unable to dissipate the energy that deep sea waves contain. This apparatus is also unsuitable for any large scope mooring applications, since a large amount of heat is generated in dissipating such large quantities of energy. Additionally, the shape memory alloy materials used are usually unsuitable for a marine environment.

SUMMARY OF THE INVENTION

The present invention relates to a damper for damping the reactionary motion of a wave energy conversion device to wave motion, comprising a damping energy absorber having a reversible non-linear stress-strain response, arranged to damp the reactionary motion of the WEC.

According to a first aspect, the present invention relates to a damping structure for a wave energy conversion device, comprising a first member, and a damping member having a reversible non-linear stress-strain response, wherein the damping member is connectable to the first member and to a second member or float of a wave energy conversion device.

In one embodiment, the present invention relates to a damping structure for a wave energy conversion device, comprising a fixed member, and a damping member having a reversible non-linear stress-strain response, wherein the damping member is connectable to the fixed member and to a moveable member or float of a wave energy conversion device.

The term "fixed member" as used herein does not require that the member is necessarily tethered or fixed to the sea-bed or other stationary point, but rather that it is fixed relative to the moveable member of the WEC device. For example, the member may have sufficient inherent inertia to prevent substantial movement thereof by wave motion. In contrast, the moveable member or float of the WEC moves in an oscillatory manner in response to wave motion of the ocean. The fixed member should be sufficiently resistant to wave motion such that wave motion causes relative movement between the fixed member and the moveable member of the WEC. The fixed member may comprise any structure capable of providing sufficient inertia. Such inertia may, for example, be provided by a raft-like structure of interconnected WEC devices. Alternatively, the inertia may be provided by a single rigid floating superstructure, acting as the fixed member for a plurality of WEC devices in a wave farm, the superstructure having a length much greater than the wavelength of the waves to obtain sufficient inertia.

In some embodiments, the first member and the second member exhibit different frequency responses to wave motion, causing relative motion therebetween when waves are incident upon them. In these embodiments, both the first and second members may be moveable members of the WEC device.

Preferably, the damping energy absorber or damping member is passive. The term "passive" as used herein indicates that the stress-strain response of the damping member is a function of the material or materials comprised therein or their design, shape or configuration, rather than being a mechanical construct requiring some additional input such as air or hydraulic pressure.

In an embodiment of the invention, the damping energy absorber or the damping member has a composite (i.e. combined or cumulative or hybrid) reversible non-linear stress-strain response. The composite response may be provided by a plurality of elements within the damping member, so that the damping member has a complex non-linear stress-strain response within its normal operating range. Thus, the clamping member may comprise a plurality of materials, each of which has a specific stress-strain response (and desirably each has a different response). The stress-strain response of the resultant damping member is thus a composite of the responses of the individual materials or the cumulative stress-strain response of the combined elements. This allows more complex stress-strain profiles to be achieved than can be provided by a single element or material. In one embodiment, the damping member could vary in thickness along its length. The stress-strain response of the damping member would therefore also vary along the length of the damping member. The stress-strain response of the resultant damping member is thus a composite of the responses of the different thickness portions. Similarly, the damping member could comprise a plurality of components of different lengths, materials or thicknesses. In all such cases, the overall stress-strain response of the damping member is a composite of the individual responses of the component parts.

The damping member is connectable to the fixed member and to the moveable member of the WEC device. The connection may be direct or indirect.

A material or member having a non-linear stress-strain response is one in which the counterforce exerted by the material or member is non-linearly related to the force applied thereto and to the rate of application of such force. In the present invention, movement of the moveable member in response to wave motion exerts a force on the damping member. The counterforce exerted on the moveable member by the damping member is non-linearly related to the applied force and the rate of application of that force. The damping member of the present invention exhibits a reversible non-linear stress-strain response. For example, the damping member may be capable of undergoing a reversible change of shape in response to an applied force. Desirably it exhibits a plurality of non-linear stress-strain responses within its operating range.

Preferably, the damping member exerts a low (or zero) counterforce until the applied force or rate of applied force exceeds a threshold, above which the counter force exerted increases sharply as the applied force increases. An example of such a response is shown in FIG. 1. The threshold value is selected such that the counter force increases According to an aspect of the present invention, the design and/or composition of the damping member can allow the response of the WEC device to be tailored to the size of the forces applied to the device and/or to the rate of change of the applied forces. The damping member may comprise a plurality of components, each of which reacts to different ranges of applied forces and/or rates of applied force.

According to an aspect of the invention, a plurality of damping members may be provided, wherein each damping member is arranged to damp the movement of the device substantially along one axis only. Each damping member may have an individual stress-strain response. As discussed above, each damping member may have a composite stress-strain profile (including two or more distinct stress-strain responses). The alignment and/or design of each damping member may allow the damper or damping structure to provide different stress-strain responses along different axes. Thus, the stress-strain response of the damping structure in each direction may be tailored to the expected conditions. The damping structure can thus be tailored to have different responses to at least one of and desirably all of heave (vertical), pitch (rotational) and surge (lateral) forces. Both compressive and tensile damping members can be provided as indeed can a combination of compressive and tensile damping members.

In one embodiment, a damping member, arranged to damp surge (lateral) forces, is used to limit the maximum lateral response of the device. The damping member is appropriately positioned or aligned so that its damping effect is applied, as far as possible, to surge forces only. A further damping member, arranged to damp heave (vertical) forces (between components of the WEC device), may be used to limit the maximum vertical extension of the device. Similarly, this damping member is positioned or aligned so that its damping effect is applied to heave forces only. Independent control over the separate forces acting on the device allows the overall response of the damping structure to be more accurately tailored to the conditions in order to protect the device.

The present invention provides several advantages over known WEC devices. The nature of the damping structure provides enhanced structural stability and resilience which prevents breakage of the WEC device by extreme waves.

The structure also provides more efficient energy capture. Ocean waves are never single frequency and always comprise higher frequency components in addition to the main frequency component. The main frequency component changes with sea state and some devices can adjust their response to tune to this frequency, but few WEC devices are capable of reacting quickly enough to capture the energy from higher frequency wave components within a single sea state. The damping member is capable of reacting to the higher frequency components of the waves, thereby allowing the WEC device to capture energy from the higher frequency components of the waves. The damping member may thus act as an energy storage device, which temporarily stores energy captured from the waves so that it can be fed back into a power take off system associated with the WEC device. Further energy capture enhancement arises from the additional sea states that can be accessed due to enhanced structural stability and resilience.

The present invention also provides an additional advantage over current WEC devices. The damping member (or members) desirably applies counter forces having both lateral and vertical components and thus automatically acts to straighten the moveable member, thus maintaining an optimal alignment to the waves when in use, that is, generally perpendicular to the direction of travel of the waves. This reduces the risk of damage to the coupling system of the WEC device caused by stress from angular differences between the moveable and fixed members of the WEC device.

In a preferred embodiment, the fixed member is a substantially rigid ring adapted for arrangement substantially concentrically around the moveable member of the wave energy conversion device. The ring may be any suitable shape including circular, square, rectangular or any other polygonal shape.

The fixed member may comprise a plurality of linked segments. Alternatively, the fixed member may comprise at least one other WEC device. Several WEC devices may be interconnected to form a raft-like structure. The devices may be linked by a fixed member, which may be substantially rigid. Alternatively, the devices may be linked by a damping member.

The size and profile of the fixed member are selected to maximise the downthrust provided by the ring. When the moveable member of the WEC device is at the highest point of the wave, it is desirable that the angle formed between the fixed member and the moveable member is less than about 45 degrees. This maximises the vertical component of the force applied to the moveable member while providing sufficient horizontal counterforce to counteract lateral surge forces.

For a single, unconnected WEC device, the fixed member is preferably a ring having a relatively large diameter to ensure that there is significant relative movement between the moveable member of the WEC device and the ring. For example, for a device in wave conditions where the height variation of the wave is between 5 and 8 meters, a suitable ring diameter is between 10 and 20 meters. In general, the size of the ring will be based on the height of the waves. The size of the ring may be selected to ensure a balance between a large vertical component of the counter force (smaller ring) to limit heave as well as sufficient lateral force to correct surge (larger ring).

For a plurality of interconnected WEC devices, it is necessary to balance the requirement for a small ring diameter to achieve the required angle with the requirement for a larger ring diameter to avoid interaction between the ring and the float and to correct heave.

Preferably, size and shape of the fixed member are selected such that it floats just below the surface of the ocean. In one embodiment, the fixed member is a ring arranged to float approximately 3 meters below the point where the moveable member of the WEC device sits in the water.

The damping member may comprise a flexible material capable of reversibly deforming in response to an applied force. The material may be a non-linear elastic material. The damping member may comprise a resiliently deformable material that exhibits a reversible non-linear stress-strain response. According to various embodiments of the invention, the damping member may comprise a non-Hookean spring, a rubber material, a viscous-elastic material or a biopolymer. Examples of such materials include polyurethane, Avery FT1125 and vimentin. The damping member may comprise a dilatant material.

The damping member may comprise a material having a plurality of bundled strands optionally interwoven. The strands may be similar to muscle fibres. The strands may be formed from a plurality of different materials, such that the resultant composite material has the desired reversible non-linear stress-strain characteristics.

The damping member may comprise a sheet or membrane of material. The sheet or membrane may be perforated. The sheet or membrane may comprise a plurality of layers. The layers may form a mattress-type structure. Valves or electronic devices may be provided in the sheet to allow for energy capture or sensing of wave conditions.

The damping member may comprise a composite material. The composite material may comprise multiple layers, such as, for example, epoxy composite viscous elastic structures.

The damping member may comprise an active response system operable to provide a reversible non-linear stress-strain response. The system may comprise a sensor for sensing wave conditions and providing wave condition information to the active response system, whereby the performance of the active response system is modified in response to the sensed conditions. In one embodiment, the active response system comprises a microprocessor controlled tensioning system. Sensors may be provided on the fixed member and the performance of the tensioning system modified in response to the sensed conditions. The system may comprise a cable, for example a steel cable, arranged on a roller. The roller may be used to alter the tension on the cable to give a reversible non-linear stress-strain response to the sensed conditions. An advantage of this arrangement is that when maintenance of the system is required, the tension on the cable can be increased so that minimal movement of the elements of the WEC device is permitted.

The damping member may comprise combinations of the materials set out above, as well as other materials which exhibit the required non-linear stress-strain characteristics.

According to a second aspect, the present invention relates to a wave energy conversion device, comprising a moveable member, a first fixed member, and a coupling provided therebetween to convert relative movement between the moveable member and the fixed member in response to wave motion into energy; and further comprising a second fixed member, and a damping member having, a reversible non-linear stress-strain response arranged between the moveable member and the second fixed member.

According to a third aspect of the invention, there is provided a wave energy conversion device, comprising a moveable member, a fixed member and a coupling provided therebetween to convert relative movement between the moveable member and the fixed member in response to wave motion into energy; wherein said coupling comprises a damping member having a reversible non-linear stress strain response.

In one embodiment, the fixed member of the wave energy conversion device according to the third aspect of the invention comprises a ring arranged substantially concentrically around the moveable member. Energy, in the form of relative motion between the moveable member and the ring (which is resistant to wave motion), may be stored by the damping member and converted to electrical energy.

In another embodiment, the damping member is provided with a plurality of electronic teeth. The teeth are arranged in two sets, such that relative movement between the moveable member and the fixed member causes movement of one set of teeth relative to the other set, so that electrical energy is generated by induction.

According to another aspect of the invention, there is provided a wave energy conversion device, comprising:
 a first moveable member; and
 a second moveable member; and a coupling provided therebetween to convert relative movement between the first and second moveable members in response to wave motion into energy; and characterised in that the coupling comprises a damping member having a reversible non-linear stress strain response.

According to a further aspect of the invention, the damping technology may be applied to a mooring component. Thus, there is provided a mooring component for a mooring system, comprising:

a deformable element having a reversible non-linear stress-strain response, wherein the response is a composite reversible non-linear stress-strain response such that the stress-strain response of the component may be tailored to the expected environmental loading for the location at which the mooring system is to be used.

An advantage of the present invention is that, because a composite response is provided, a single mooring component may effectively be tailored to cope with a number of sea states or environmental conditions. The composite stress-strain profile may have a number of points of non-linearity, such that the deformable element provides a sharp increase in counterforce at several thresholds or levels of applied force, with a substantially linear response between those points. This means that the scope and the seabed footprint of the mooring system may be reduced, while providing an improved response to a variety of environmental loads. The tailored non-linear stress strain response allows for a wide range of potential response curves to be designed into the system, with desired forces delivered at specific extensions. The material hysteresis can also be tailored allowing for controlled dampening.

As above, the term "tailored" as used herein indicates that the material or materials used are in a shape, form or configuration that allows the stress-strain response to meet a specific desired performance profile. Thus, the deformable element or elements must be designed and modified to meet the desired or required curve. Such tailoring is required for each component to optimise its performance for the expected location in which it will be placed and the environmental forces to which it will be subjected.

Preferably, the deformable element is passive. As before, the term "passive" as used herein indicates that the stress-strain response of the damping member is a function of the material or materials comprised therein or their design, shape or configuration, rather than being a mechanical construct requiring some additional input such as air or hydraulic pressure.

The term "composite" as used herein indicates that the stress-strain response is a combined or cumulative or hybrid reversible non-linear stress-strain response. Preferably, the mooring component comprises a plurality of deformable elements and/or a single deformable element having a plurality of portions and the composite response is a combination of the responses of each of the plurality of elements or portions. Thus, the deformable element may have a complex non-linear stress-strain response within its normal operating range. This allows more complex stress-strain profiles to be achieved than can be provided by a single element or portion.

As set out above, an element having a non-linear stress-strain response is one in which the counterforce exerted by the element is non-linearly related to the force applied thereto and to the rate of application of such force. In the present application, movement of a moored body in response to wave or tidal motion exerts a force on the deformable member. The counterforce exerted on the moored body by the deformable element is non-linearly related to the applied force and the rate of application of that force. The deformable element of the present invention exhibits a reversible non-linear stress-strain response. For example, the deformable member may be capable of undergoing a reversible change of shape in response to an applied force. Desirably, it exhibits a plurality of non-linear stress-strain responses within its operating range.

In many mooring applications, there is a requirement for this counterforce to be non-zero, thereby providing a restoring force to return the moored body to its original location.

FIG. 27 shows an example of a composite or cumulative non-linear stress-strain responses for a mooring component according to the invention. As shown in the figure, a more complex stress-strain profile may be achieved than is possible with a single material or element. As shown, the composite stress-strain profile may have a number of points of non-linearity, such that the damping member provides a sharp increase in counterforce at several thresholds or levels of applied force, with a substantially linear response between those points.

Suitably, the deformable element is an elongate flexible element.

In an embodiment, the deformable element comprises a plurality of elements or portions and the composite response is a combination of the responses of each of the plurality of elements or portions.

In one embodiment, a shape or diameter of the elongate flexible element varies along its length, so that the element comprises a plurality of portions of different shape or diameter and the composite response is a combination of the responses each of the different shape or diameter portions.

Alternatively, or additionally, the elongate flexible element comprises a plurality of portions, wherein a portion comprises a different material to one or more other portions so that the composite response is a combination of the responses of the material of each of the portions.

In preferred embodiments, the mooring component comprises a plurality of elongate flexible elements. An element may have a different length to one or more other elements, so that the composite response is a combination of the responses each of the different length elements. Alternatively, or additionally, an element may be formed from a different material to one or more other elements, so that the composite response is a combination of the responses of the material of each of the elements. In other embodiments, the cross-sectional area (thickness) of an element may differ from that of one or more other elements, so that the composite response is a combination of the responses each of the different thickness elements.

Typically, the total cross sectional area of the mooring line may be reduced by more than 30% when compared with traditional mooring lines, significantly reducing costs.

In one embodiment of the invention, the deformable element comprises at least one of a thermoplastic material (such as Hytrel) or an elastomeric material (such as Viton or Neoprene). These materials are suitable for marine use and may have extreme lifetimes of over 20 years.

In a preferred embodiment, the possible elongation of the component (i.e. the available stretch) is such that a minimum length of component is required to achieve the desired performance. Ideally, the component is capable of elongations up to 300% and is placed close to the ocean surface (when part of a larger mooring system) to minimise stress on the rest of the mooring system. This ensures that the wave or tidal motion causes only the mooring component (and not the entire mooring system) to stretch.

In a preferred embodiment, the component is relatively short. For example, a 15 meter long component capable of stretching to 40 meters reduces the footprint of the mooring system from 150 meters to 40 meters. This ensures that the stress along the component itself is essentially constant.

Ideally, the component is submerged (i.e. just below the surface) to reduce heating and to increase the amount of energy that can be dissipated by the deformable element if required.

Suitably, the component is connectable between a floating body, such as a floating fish farm, a floating platform, a wave energy conversion device or a floating wind farm, and the sea bed. Alternatively, the component is connectable between two (or more) floating bodies. The connection may be direct or indirect.

According to another aspect of the invention, there is provided a mooring component for a mooring system, comprising:

a deformable element having a reversible non-linear stress-strain response, wherein the response is a composite reversible non-linear stress-strain response such that the stress-strain response of the component may be tailored to the expected environmental loading for the location at which the mooring system is to be used;

wherein the component responds differently to different excitation frequencies.

Such a component may respond to tidal changes, for example, by stretching, but may be unresponsive to changes caused by wave motion.

According to another aspect of the invention, there is provided a mooring system comprising a mooring component as described above. The mooring system may be a mooring system for a deep sea environment, a tidal flow environment or a tidal barrage environment.

According to a further aspect of the invention, there is provided a method of manufacturing a mooring component for a deep sea mooring system, comprising the steps of:

identifying a body to be moored and a location in which it is to be moored;

determining the expected environmental loading for the location;

determining the desired stress-strain response of the component to the expected environmental loading;

providing a deformable element having a composite reversible non-linear stress-strain response which matches the desired stress-strain response.

The method may further comprise providing a plurality of deformable elements and/or a single deformable element having a plurality of portions, such that the composite response is a combination of the responses of each of the plurality of elements or portions.

BRIEF DESCRIPTION OF THE DRAWINGS

Several embodiments of the damping structure for a wave energy conversion device and the mooring component in accordance with the invention will now be described with reference to the accompanying drawings, wherein.

DETAILED DESCRIPTION OF THE DRAWINGS

Figure 1:
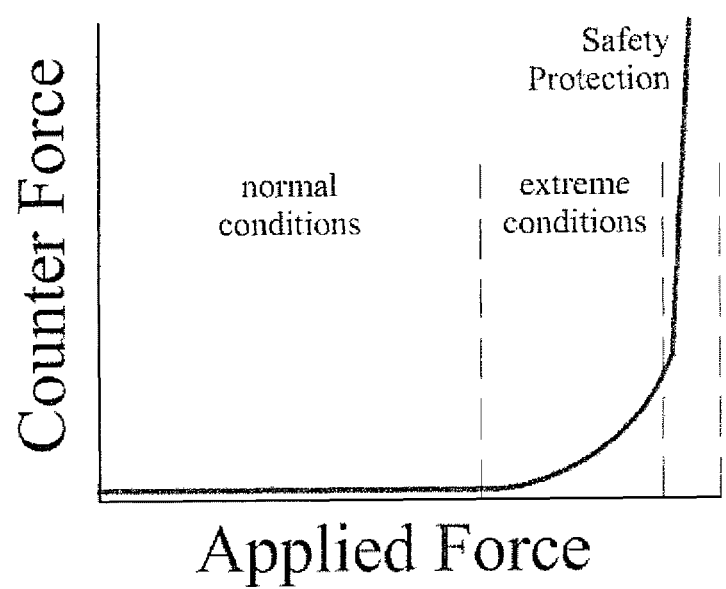
FIG. 1 is a graph showing counter force versus applied force for a material having a reversible non-linear stress strain response.
Figure 2:
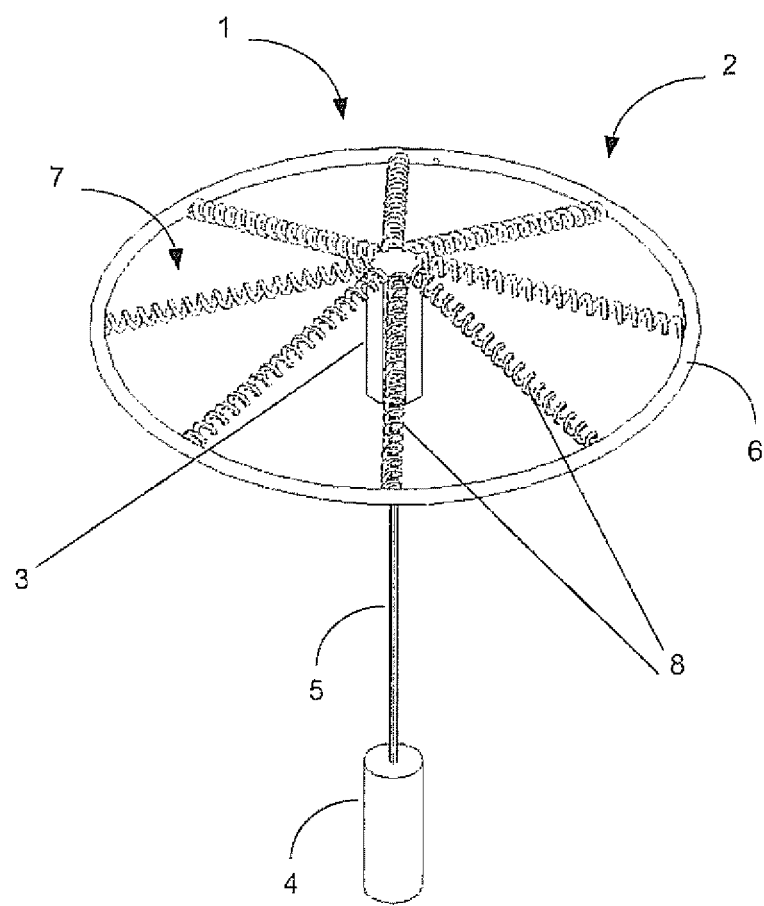
FIG. 2 is a perspective view of a wave energy conversion device comprising a damping structure according to an embodiment of the invention.
Figure 3:
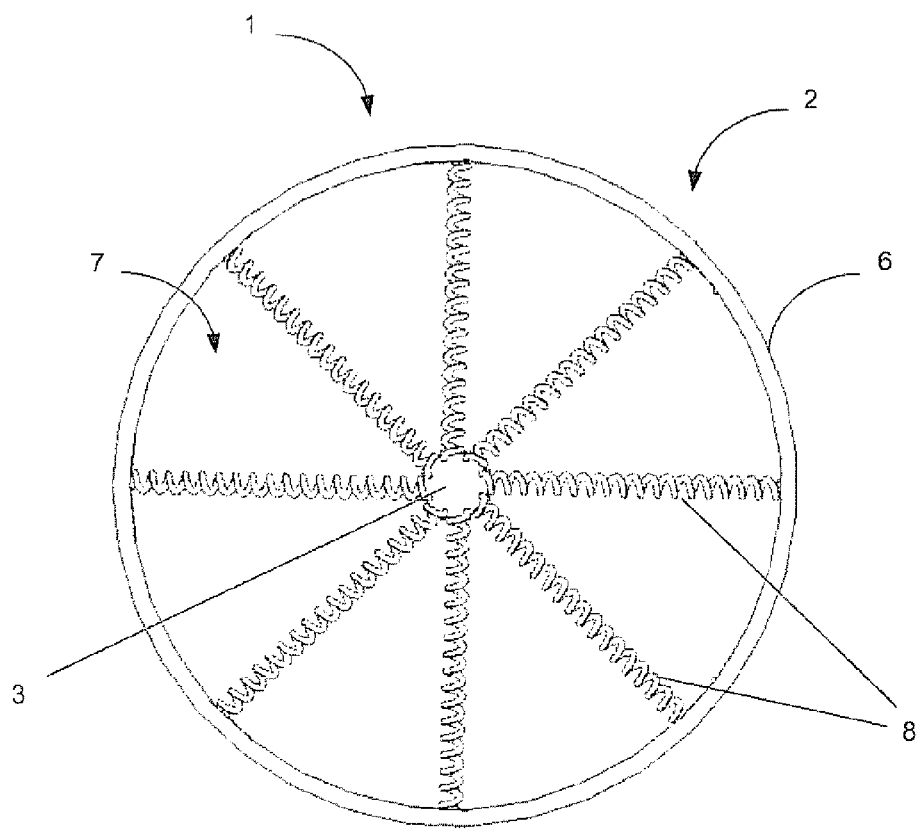
FIG. 3 is a top plan view of the wave energy conversion device of FIG. 1.
Figure 4:
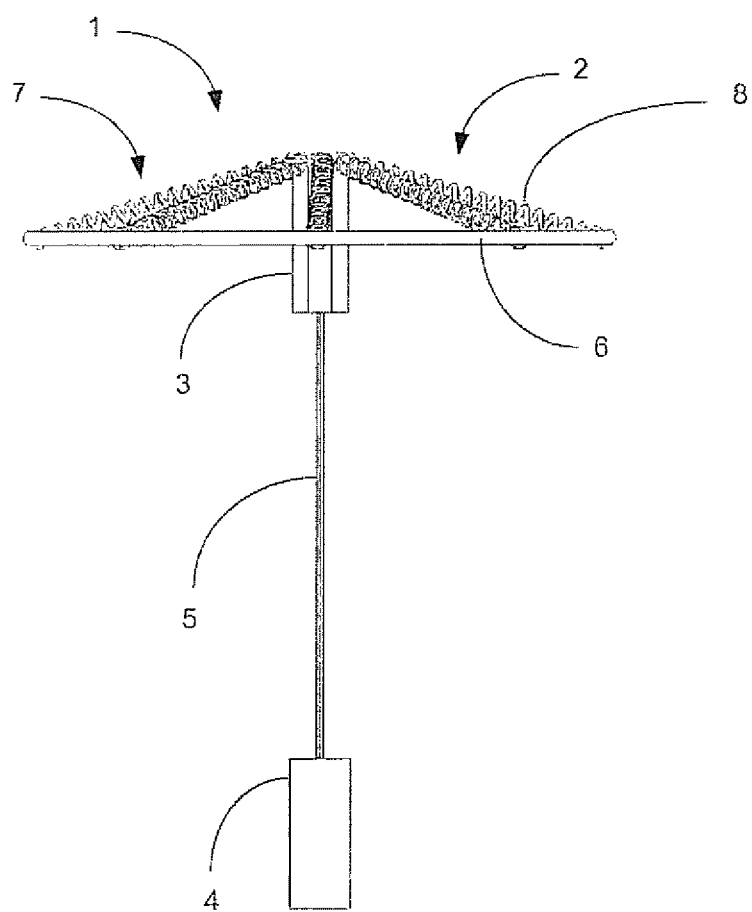
FIG. 4 is a side elevation view of the wave energy conversion device of FIG. 1.

Referring to FIGS. 2 to 4 of the drawings, there is illustrated a WEC device 1 of the point absorber type, comprising a damping structure 2 according to the present invention. This type of WEC device absorbs energy caused by vertical movement of the ocean surface during wave conditions, that is, varying height of water column at the device location. The structure of the present invention is equally applicable to other types of WEC device.

The device 1 comprises a moveable absorbing member or float 3 and a first fixed member 4. The first fixed member 4 may be anchored or tethered to the sea-bed or may simply be sufficiently heavy to provide an inherent inertia which prevents substantial movement thereof in response to wave motion, for example, floating ballast. In use, the first fixed member 4 is submerged beneath the surface of the ocean. The buoyancy of the moveable member 3 is chosen such that it floats on or near the surface of the ocean. A linkage or coupling 5 is provided between the moveable member 3 and the fixed member 4. The linkage 5 comprises a power take off device to convert relative motion between the moveable member 3 and the fixed member 4 into electrical energy. The power take off device may be, for example, a linear electric generator.

The damping structure 2 comprises a second fixed member 6 and a damping member 7. The second fixed member 6 is a substantially rigid outer ring arranged substantially concentrically around the float 3 of the device 1. The damping member 7 comprises a plurality of springs 8 having a reversible non-linear or non-Hookean stress versus strain behaviour arranged between the float 3 and the ring 6.

In use, the device is arranged such that the fixed member or ballast 4 is submerged beneath the surface of the ocean. The moveable member 3 is arranged such that it floats on or near the surface of the ocean. As an ocean wave 10 approaches the device 1, the buoyancy of the moveable member causes it to move upwards with the surface of the ocean. The first fixed member 4 is resistant to wave motion and therefore remains substantially stationary. The moveable member 3 therefore moves relative to the first fixed member 4. The power take off device converts this relative motion to electrical energy.

As the wave 10 passes the device 1, the moveable member 3 moves downwards relative to the first fixed member 4. The power take off device also converts this relative motion to electrical energy.

Figure 5:
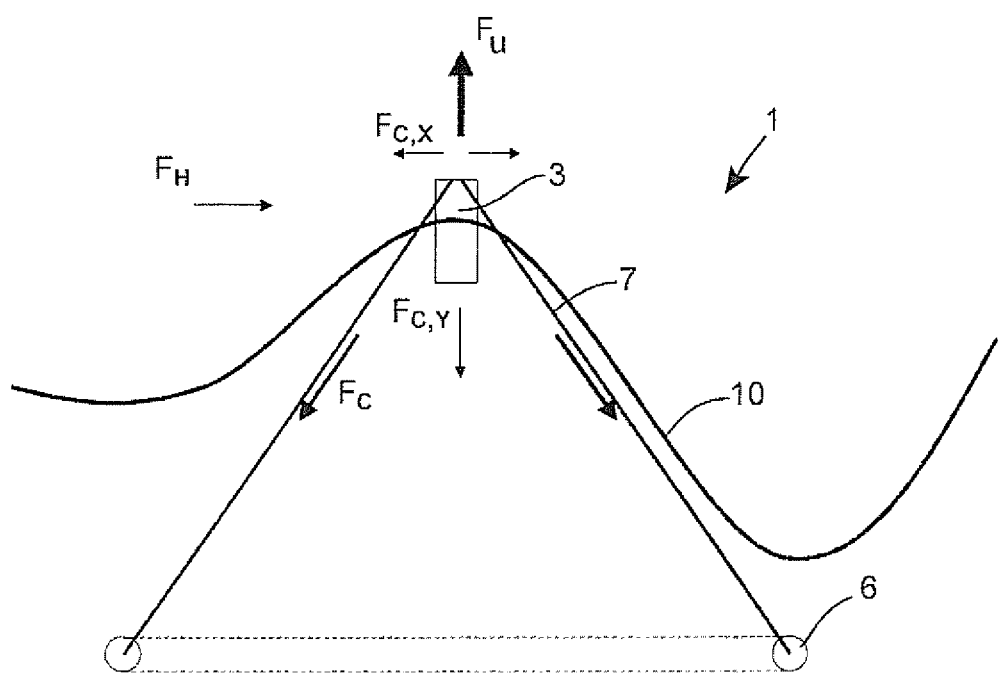
FIG. 5 is a schematic representation of a wave energy conversion device comprising a damping structure according to the invention.

The movement of the moveable member 3 in each case exerts a force on the damping structure 2. The ring 6 is resistant to wave motion and therefore remains substantially stationary. When a wave 10 passes the device 1, the upward movement of the float 3 exerts an upward heave force $F_U$ on the springs 8 of the damping member 7 as shown in FIG. 5.

The forward motion of the wave also exerts a lateral surge force $F_H$ on the WEC device. In response to an extreme wave, the springs 8 of the damping member 7 exert a dampening counterforce $F_C$ on the float 3. The dampening counterforce comprises a vertical component $F_{C,Y}$ and a horizontal component $F_{C,X}$. The vertical component of the counterforce counteracts the upward heave force $F_U$, while the horizontal component of the counterforce counteracts the lateral surge force applied by the wave.

Figure 6A:
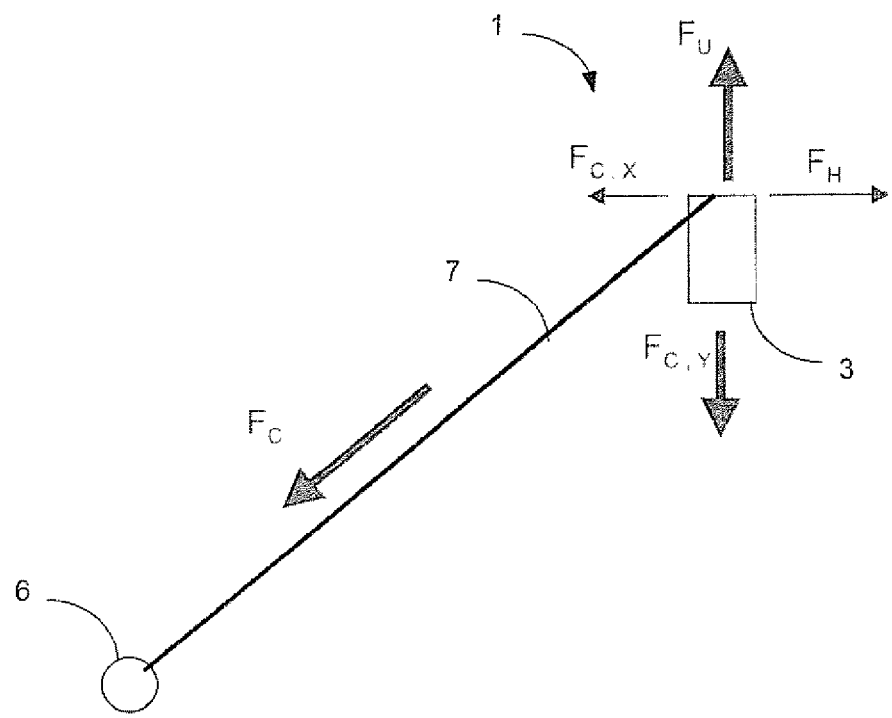
FIG. 6a is a schematic representation of the forces applied to the float of the WEC device at the peak of an extreme wave.
Figure 6B:
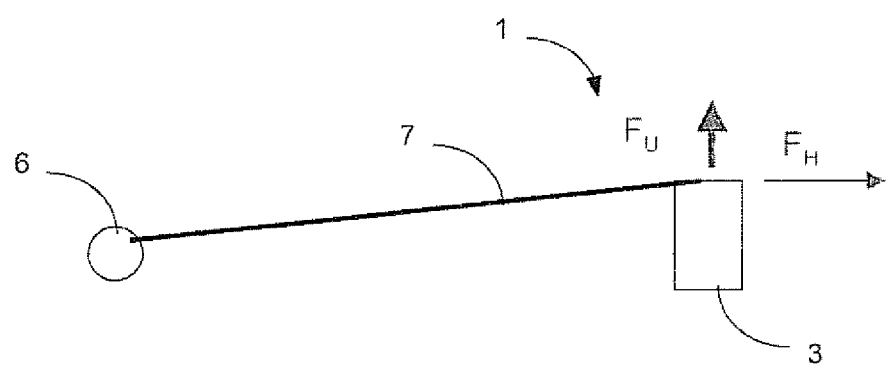
FIG. 6b is a schematic representation of the forces applied to the float of the WEC device at the peak of a normal wave.
Figure 6C:
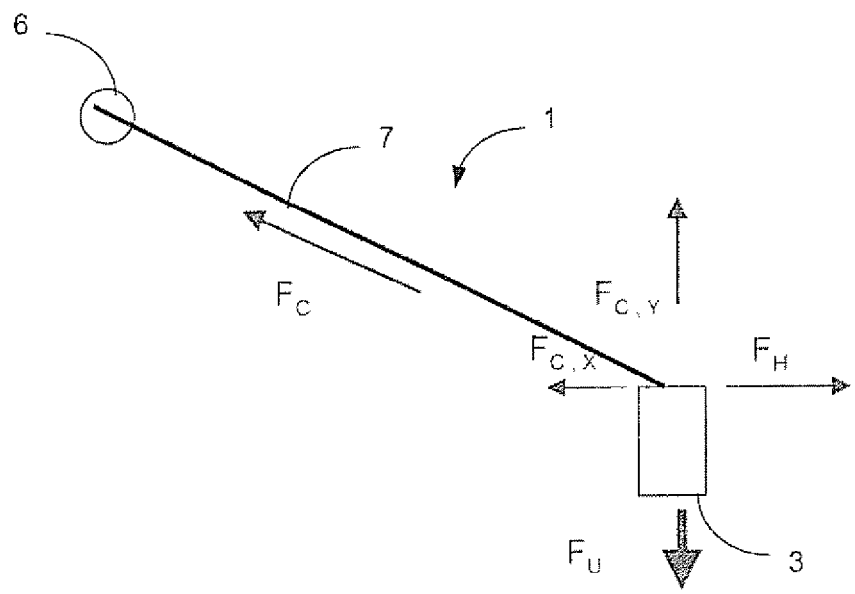
FIG. 6c is a schematic representation of the forces applied to the float of the WEC device in the trough of an extreme wave.

The dampening counterforce increases non-linearly with respect to both the applied force and the rate of change of the applied force. For normal waves, the dampening counterforce is very low as shown in FIG. 6b, and the movement of the float 3 in response to the wave is not substantially affected. However, when the force applied (or the rate of change of the applied force) exceeds a threshold, for example, in the case of an extreme wave, the dampening counterforce is much higher as shown in FIGS. 6a and 6c, thereby preventing extreme movement of the float 3. The non-linear stress strain response of the springs 8 is selected such that the threshold is reached for waves of a size and speed which would otherwise be likely to cause breakage of the device 1. The application of an appropriate dampening counterforce thereby prevents breakage of the linkage 5 between the float 3 and the first fixed member 4.

The damping structure 2 also provides more efficient energy capture since the damping member 7 is capable of reacting to the higher frequency components of incident waves, thereby allowing the WEC device to capture energy from the higher frequency components of the waves. The damping member 7 acts as an energy storage device, which temporarily stores energy captured from the waves and feeds it back into the power take off system of the WEC device 1.

Furthermore, since the damping member 7 applies counter forces having both lateral and vertical components, it thus automatically acts to straighten the moveable member 3. This prevents the WEC device 1 from resting in a tilted position or orientation in the ocean, thus maintaining an optimal alignment to the waves. This reduces the risk of damage to the coupling system 5 of the WEC device 1 caused by stress from angular differences between the moveable member 3 and fixed members 4 of the WEC device.

Figure 7:
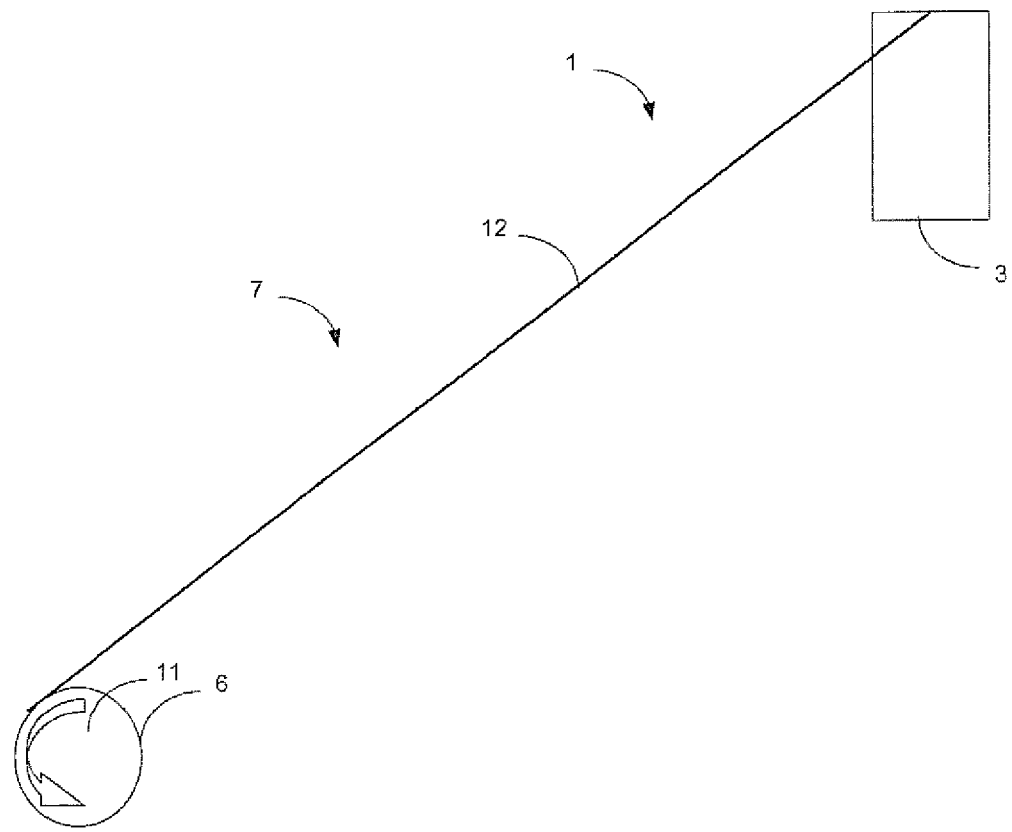
FIG. 7 is a schematic representation of an alternative embodiment of a damping structure according to the present invention.

Referring now to FIG. 7, there is illustrated an alternative embodiment of the damping structure of the present invention. The damping member 7 comprises an active response system operable to provide a reversible non-linear stress-strain response. The active response system comprises a microprocessor controlled tensioning system. The system may comprise a cable 12, for example a steel cable, arranged on a roller or spool 11. Sensors may be provided on the spool 11 to detect its rotation rate and position. The roller 11 is used to alter the tension on the cable 12 to give a reversible non-linear stress-strain response to the sensed conditions. In alternative embodiments, the cable 12 may comprise rigid, flexible, or non-linear materials.

Figure 8:
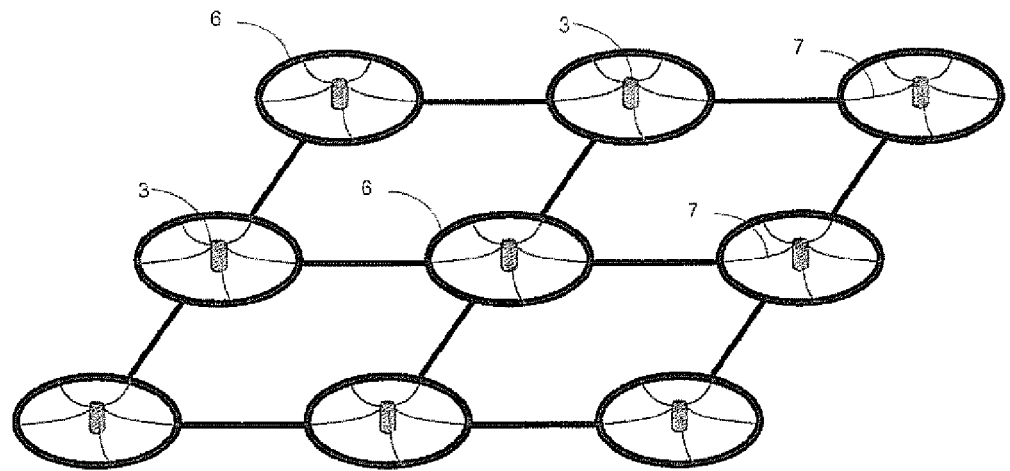
FIG. 8 is a schematic representation of an array of interconnected WEC devices.

As shown in FIG. 8, several WEC devices comprising damping structures according to the present invention may be interconnected to form a raft-like structure. The WEC devices may be interconnected by means of fixed members, which may be rigid. Alternatively, the WEC devices may be interconnected by means of damping members.

Figure 9:
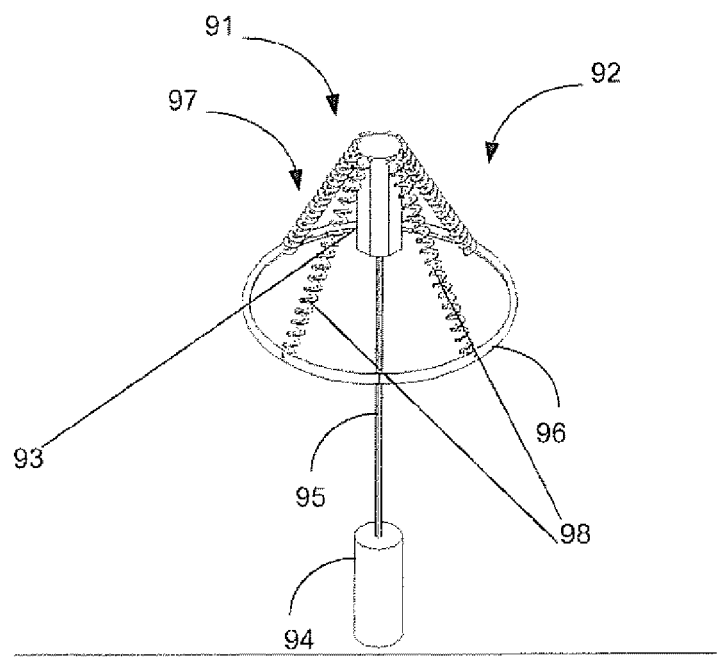
FIG. 9 is a perspective view of a WEC device comprising an alternative damping structure according to an embodiment of the invention.

Referring to FIG. 9 of the drawings, there is illustrated a WEC device 91 of the point absorber type, comprising a damping structure 92 according to the present invention. The device 91 comprises a moveable absorbing member or float 93 and a first fixed member 94 as described with reference to FIGS. 2 to 4 above. Linkage or coupling 95 is provided between the moveable member 93 and the fixed member 94, as also described above. The damping structure 92 comprises a second fixed member 96 and a damping member 97. The second fixed member 96 is a substantially rigid outer ring arranged substantially concentrically around the float 93 of the device 91, as described above. The damping member 97 comprises a plurality of dampers in the form of springs 98 having a reversible non-linear or non-Hookean stress versus strain behaviour arranged between the float 93 and the ring 96.

The damping structure 92 of FIG. 9 provides the device 91 with enhanced protection from heave (vertical) forces. When the device is at rest, second fixed member 96 lies below the float 93, so that the damping member is arranged at an acute angle to the float 93. Thus, the damping member can exert a much higher counter force in a vertical direction than in a lateral direction, thereby providing increased protection to the device from excessive heave forces. In a similar manner, individual dampers may be positioned or aligned to address specific expected device relative movements.

Figure 10:
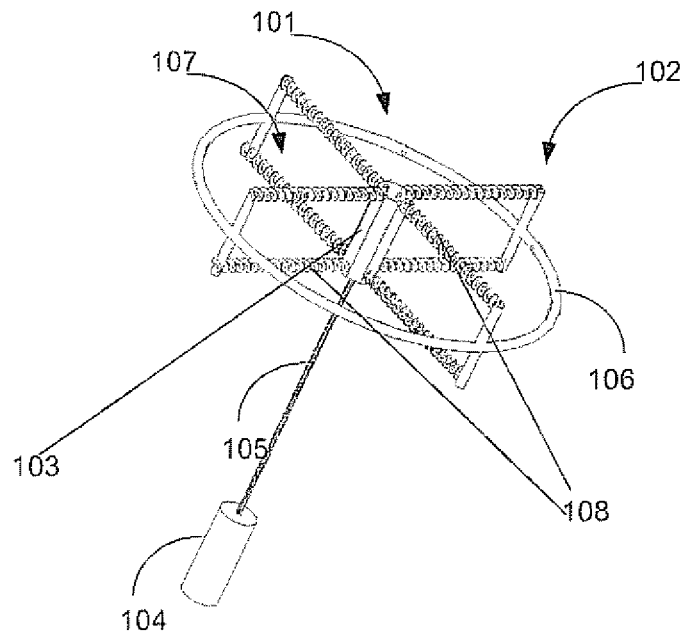
FIG. 10 is a perspective view of a WEC device comprising a damping structure according to another embodiment of the invention.

FIG. 10 shows a WEC device 101 of the point absorber type, comprising a damping structure 102 according to the present invention. The device 101 comprises a moveable absorbing member or float 103, a first fixed member 104 and linkage or coupling 105 therebetween as in FIG. 9. The damping structure 102 comprises a second fixed member 106 and a damping member 107. The second fixed member 106 is a substantially rigid outer ring arranged substantially concentrically around the float 103 of the device 101 and the damping member 107 as illustrated comprises a plurality of dampers 108, as in FIG. 9.

The damping structure 102 of FIG. 10 provides the device 101 with increased protection from pitch forces. The dampers 108 are arranged in pairs, such that one spring of each pair is attached to the top of the float 103 and the other is attached to the bottom of the float 103. Pitch forces cause rotation of the device around the centre of gravity (or the waterline). Pitch forces from the waves cause the float 103 to rotate above this point. To counteract these forces, the dampers 108 are used to apply counter forces at a distance from the centre of rotation. The greater the distance between the point of application of the counterforce and the centre of rotation, the lower the damping force required to counteract pitch.

Figure 11:
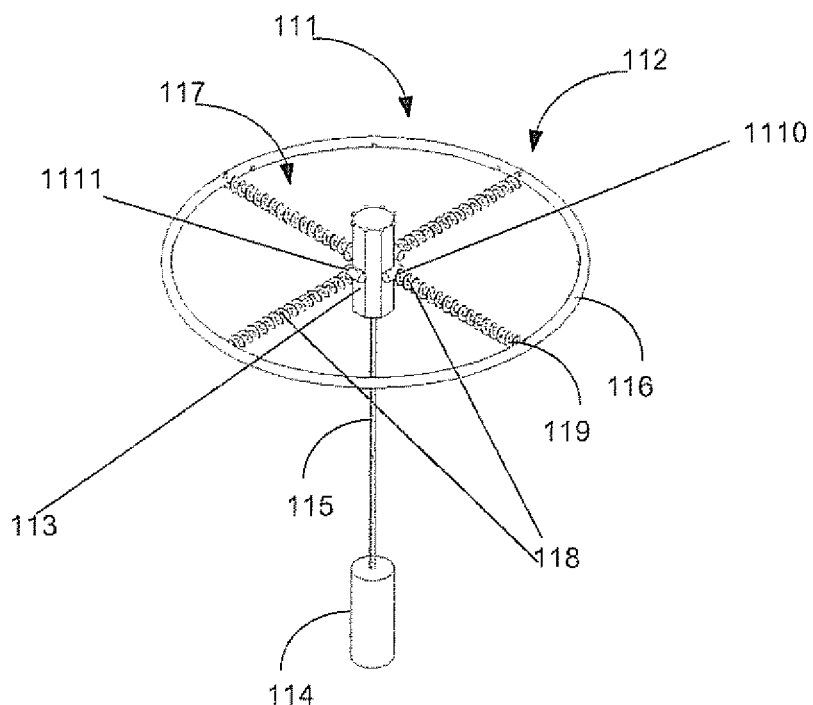
FIG. 11 is a perspective view of a WEC device comprising a damping structure according to a further embodiment of the invention.

FIG. 11 shows a WEC device 111 similar to that shown on FIG. 9. The damping structure 112 of FIG. 11 provides the device 111 with increased protection from surge (lateral) forces. The dampers 118 are connected at one end 119 to the second fixed member 116 as in previous embodiments. However, at the other end 1110, each spring 118 is in contact with the float 113, but is not fixedly attached thereto. A roller 1111 is provided at the end 1110 of the spring, so that the float 113 is allowed to move freely in a vertical direction (i.e. perpendicular to the spring) but the damper exerts a damping force if the float moves laterally (due to surge). This arrangement allows the damping structure to work in a single direction only, leaving the float free to move in other directions. Additional dampers may then be used to control movement in the other directions.

In alternate embodiments, the roller may be replaced with another element which allows the spring to slide freely in a single direction.

Figure 12:
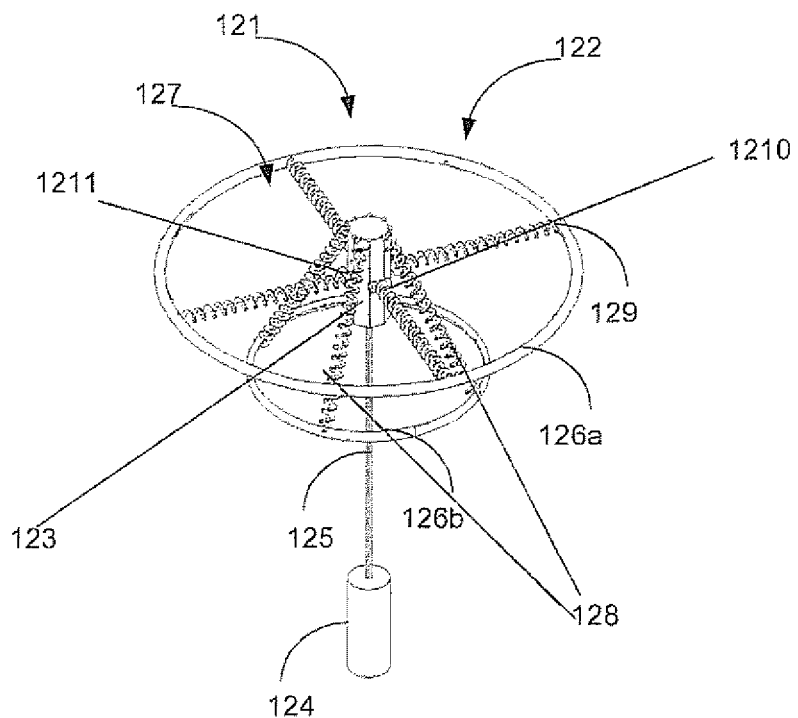
FIG. 12 is a perspective view of a WEC device comprising a damping structure according to another embodiment of the invention.

FIG. 12 shows a WEC device 121 which combines the features of FIGS. 9 and 11. The damping structure 122 protects the device 121 from excessive heave and surge forces. This arrangement allows the counter forces exerted by the damping structure to be independently tuned in different directions. This allows undesired or excessive forces in a particular direction to be counteracted without impacting on perpendicular forces and with lower impact on non-perpendicular forces. In this embodiment, the device 121 includes two additional fixed members in the form of rings 126a and 126b.

In alternate embodiments, both fixed members 126a and 126b may be combined into a single element. Alternatively, they may be split into multiple fixed members. The arrangement shown in FIG. 12 may be adapted for use in any alignment.

Figure 13:
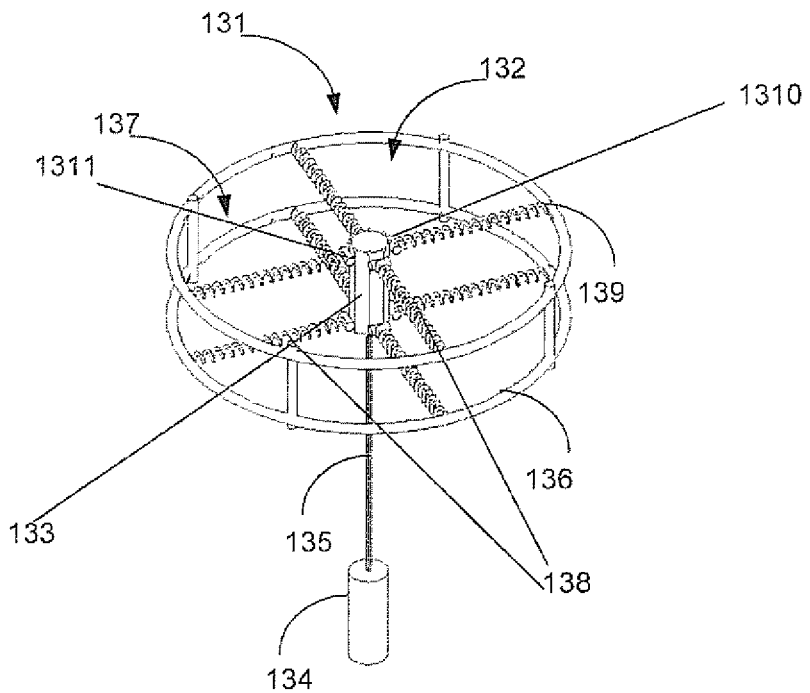
FIG. 13 is a perspective view of a WEC device comprising a damping structure according to a further embodiment of the invention.

FIG. 13 shows a WEC device 131 in which the damping structure 132 protects the device from excessive surge and pitch forces. In this arrangement, the dampers 138 are arranged in pairs as in FIG. 10. However, each damper 108 is provided with a roller 1311 at one end thereof, to allow the float to move freely in a vertical direction. Thus, the dampers 138 are used to control pitch and surge forces. In the embodiment shown, pitch and surge are both controlled by a single set of dampers. However, the two forces could be controlled separately by providing an intermediate damping structure to separate surge protection dampers and pitch protection dampers. An outer damping structure would have a set of dampers to protect the intermediate structure from surge (as shown in FIG. 11 for example), while the intermediate damping structure would comprise dampers to protect the float (and thus the WEC device) from pitch (as shown in FIG. 10 for example).

Figure 14:
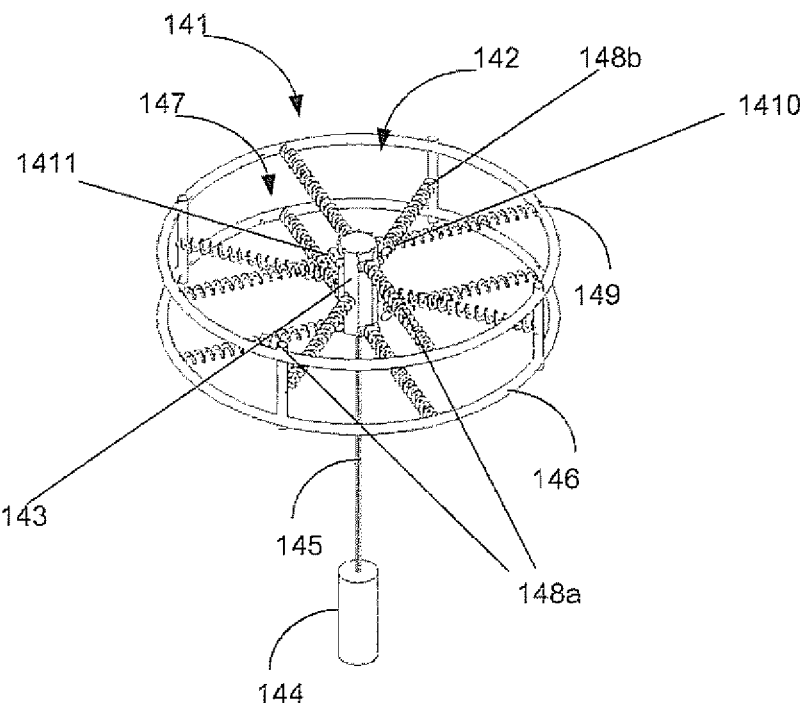
FIG. 14 is a perspective view of a WEC device comprising a damping structure according to another embodiment of the invention.

FIG. 14 shows a WEC device 141 comprising a damping structure 142 which protects the device from excessive heave forces, as well as combined pitch and surge forces. Pitch and surge forces are controlled together as in FIG. 13. Pairs of vertically spaced dampers 148a are provided. The dampers 148a are connected at one end 149 to the fixed member 146. At the other end 1411, a roller 1410 is provided to allow the dampers 148a to move freely in a vertical direction along the float 143. Heave forces are controlled by dampers 148b which are connected to the float 143 and to the fixed member 146.

Figure 15:
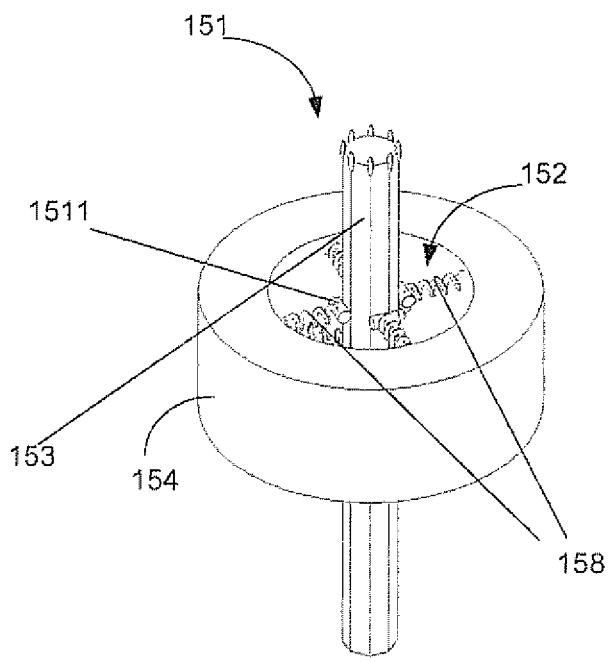
FIG. 15 is a perspective view of a dual surface piercing WEC device comprising a damping structure according to an embodiment of the invention.
Figure 16:
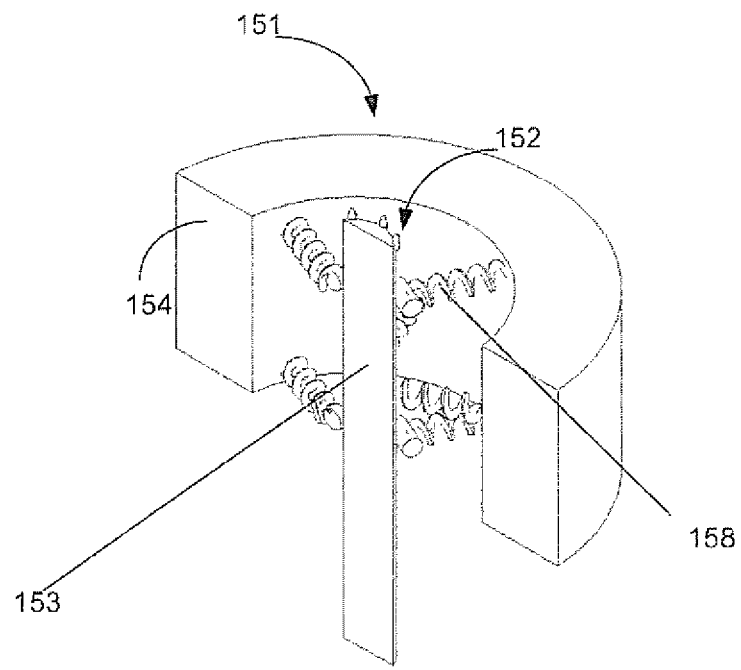
FIG. 16 is a cutaway perspective view of the WEC device of FIG. 15.

FIGS. 15 and 16 show a dual surface piercing WEC device, incorporating a damping structure according to the present invention. The arrangement is similar to that shown in FIG. 14. The device 151 comprises a central float 153 and an outer member or "donut" 154. The float 153 and the donut 154 exhibit different frequency responses to wave motion, so that they respond differently to waves incident on the device. This causes relative motion between the components, from which energy may be captured. In this embodiment the damping members 158 are arranged between the float 153 and the donut 154 to damp the relative motion therebetween. The dampers in this embodiment control the heave, surge and pitch forces on the device as described above with reference to FIG. 14. The dampers protect the device from pitch and surge forces which cause the float 153 and the donut 154 to collide together, and also control the maximum heave extensions allowed between the components.

Figure 17:
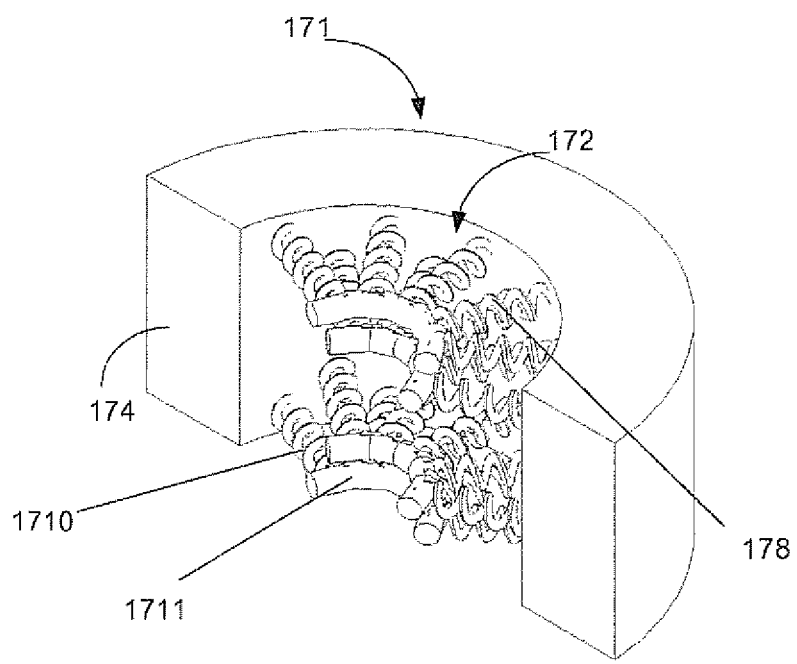
FIG. 17 is a cutaway perspective view of a WEC device comprising a damping structure according to an embodiment of the invention.

FIG. 17 shows a WEC device 171 comprising a damping structure which protects the device from excessive surge forces. The damping structure comprises a plurality of dampers 178 so that the maximum force applied to any one damper is reduced. The dampers 178 are provided at their inner ends 1710 with rollers or low-friction devices 1711 (and are not fixedly attached to the float) to allow the dampers to work in compressive mode.

Figure 18:
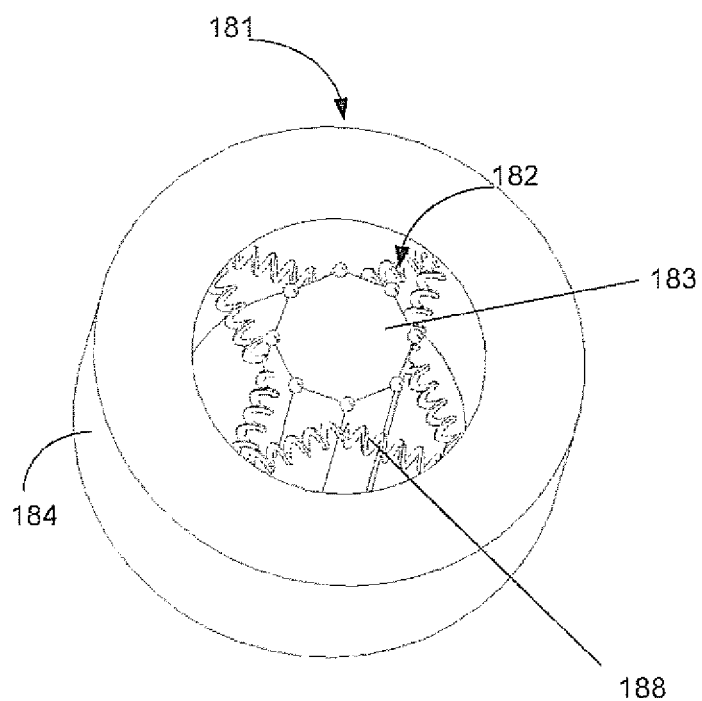
FIG. 18 is a perspective view of a WEC device comprising a damping structure according to another embodiment of the invention.

FIG. 18 shows a WEC device 181 comprising a damping structure 182. The WEC device is similar to that shown in FIGS. 15 and 16. The structure comprises a plurality of longer dampers, which have been fitted into the narrow space between the central float 183 and the donut 184. This arrangement is particularly useful where a long damper is required in order to achieve the desired response, but where the narrow space between the elements of the device limits the way in which the damper may be arranged. This arrangement would normally require that the dampers be arranged in pairs to avoid application of rotational forces between the floats 183 and 184.

Figure 19:
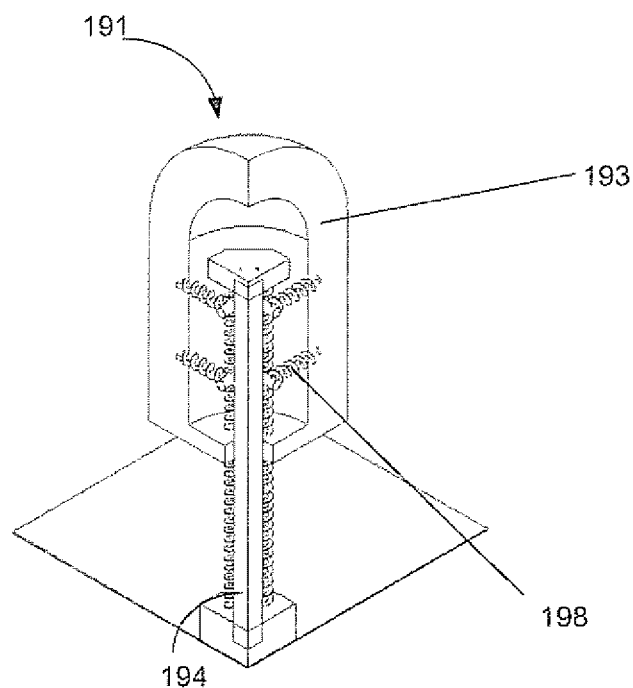
FIG. 19 is a cutaway perspective view of a WEC device comprising a damping structure according to an embodiment of the invention.

FIG. 19 shows a WEC device 191 comprising a float 193 and a seabed-attached shaft 194. The shaft 194 may be rigidly attached to the seabed, or attached by means of a flexible joint or cable. The float 193 may be surface piercing (i.e. partially submerged) or sub-surface and moves relative to the shaft when waves are incident upon the device (or above the device). The damping structure 192 comprises a plurality of dampers 198 attached between the float and the shaft to control the relative motion therebetween. As shown in the drawing, two pairs of dampers are arranged to correct pitch and surge of the device. These dampers are connected at one end to the inside of the float 193 and are provided with rollers at the other end, so that they can move freely in a vertical direction relative to the shaft 194. Two further pairs of dampers are provided to correct heave. The first pair of these dampers is connected between the lower end of the float 193 and the lower end of the shaft 194. When the float 193 moves upwards due to wave motion, these dampers exert a downward damping force on the float. This pair of dampers could alternatively be attached between the upper end of the shaft and the top of the float. The second pair of these dampers is connected between the upper end of the shaft and the lower end of the float. When the float moves downwards due to wave motion, these dampers exert an upward damping force on the float.

Figure 20:
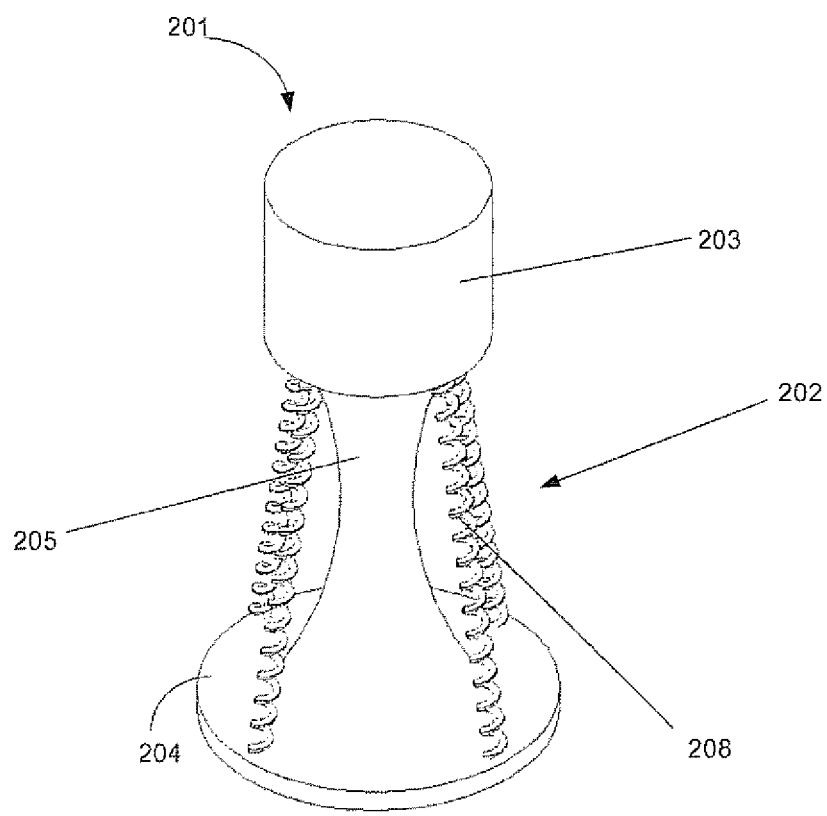
FIG. 20 is a perspective view of a WEC device comprising a damping structure according, to an embodiment of the invention.

FIG. 20 shows a WEC device 201 comprising an upper member 203 and a lower member 204. The upper and lower members 203 and 204 are connected by means of a flexible tube 205. The upper and lower members move relative to one another when waves are incident on the device 201. This squeezes and relaxes the tube, pumping water therethrough. The pumped water is used to capture energy from the device. The damping structure 202 comprises a plurality of dampers 208 connected between the upper and lower members 203 and 204. The dampers 208 limit the maximum extension (and/or rate of change of extension of the device), and thereby protect the flexible tube of the device from excessive forces.

Figure 21:
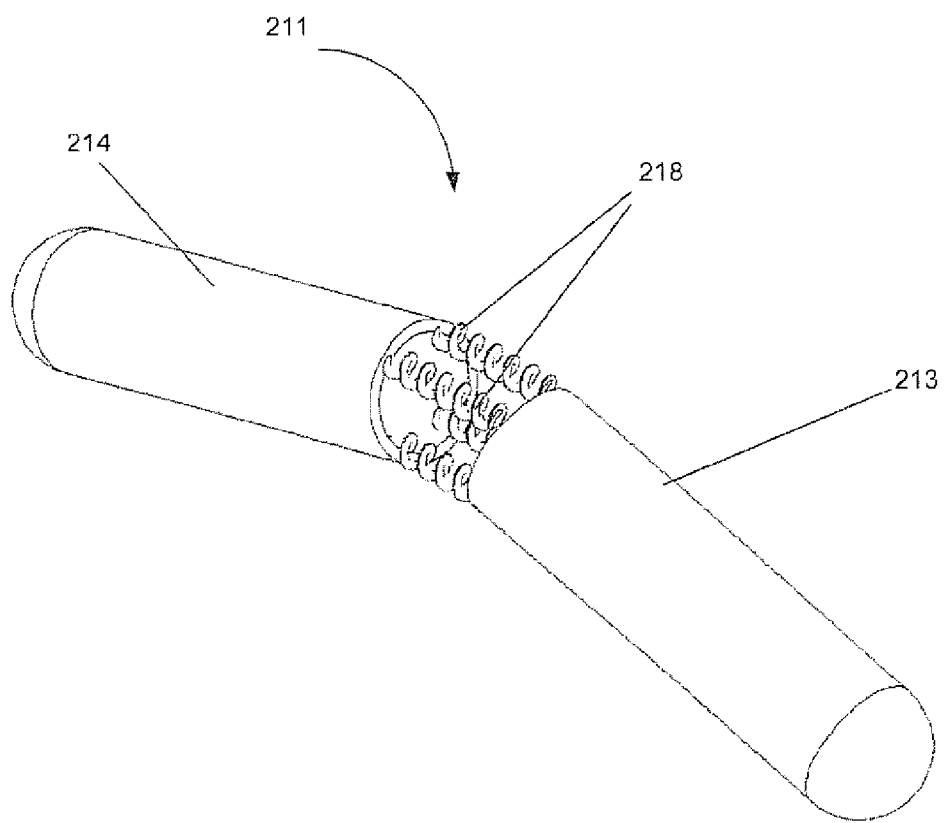
FIG. 21 is a perspective view of a WEC device comprising a damping structure according to an embodiment of the invention.
Figure 22:
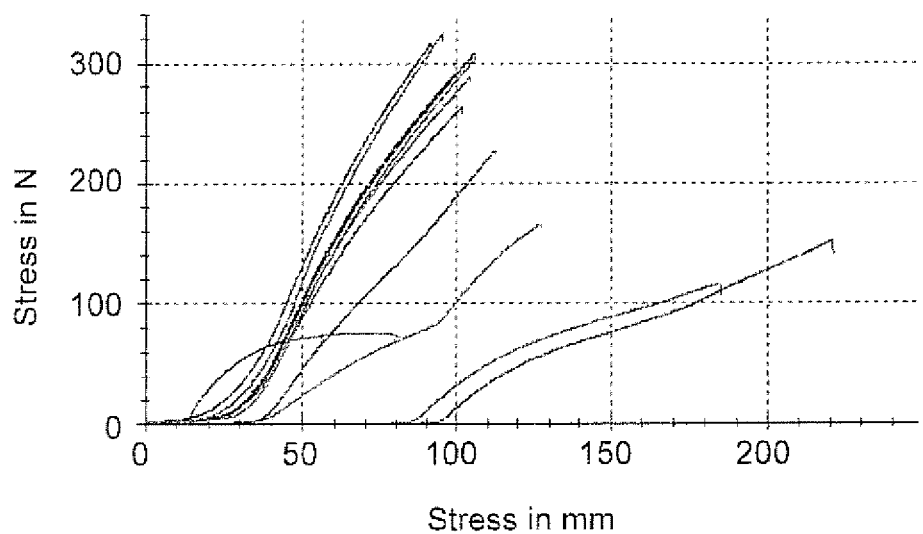
FIG. 22 is a graph showing stress versus strain for damping members having a composite reversible non-linear stress strain response.
Figure 23:
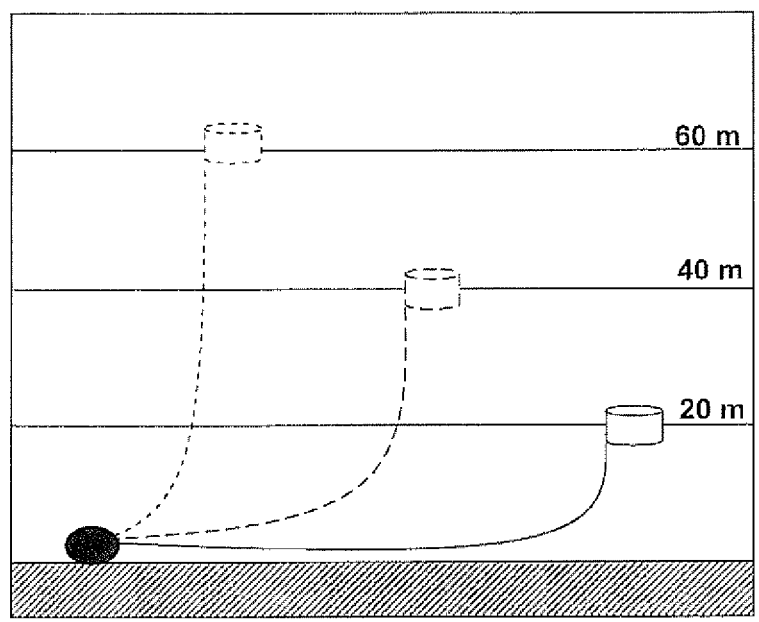
FIG. 23 is a schematic representation of a prior art mooring system.

FIG. 21 shows a surface floating WEC device 211 comprising two floating members 213 and 214 which are designed to float on the water surface. The floats are allowed to pivot relative to one another on all directions. Waves incident on the device cause each float to pitch, heave and surge, causing relative motion between them. Dampers 218 are provided between the floats at the pivot point to control the maximum extension and rate of extension between the floats to be controlled. The dampers may be tensile or compressive, or a mixture of both.

Figure 24:
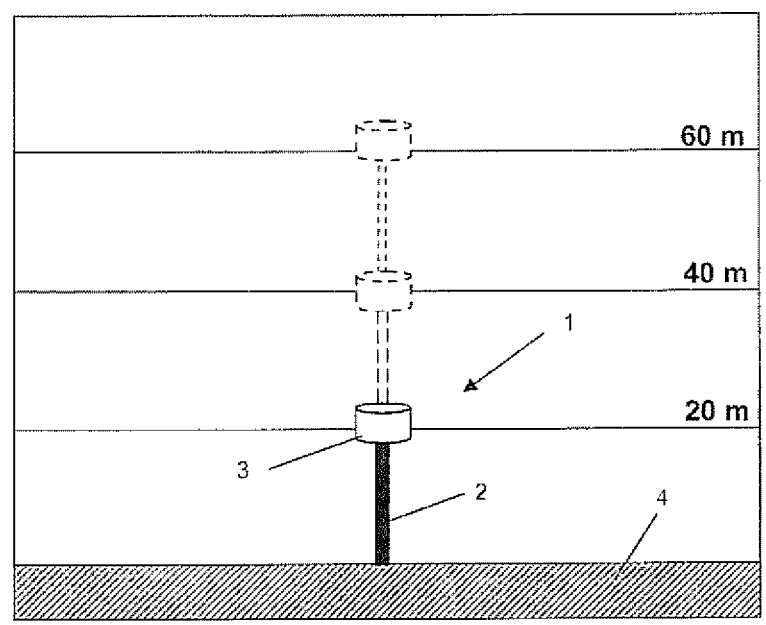
FIG. 24 is schematic representation of a first embodiment of a mooring system according to the present invention.
Figure 25:
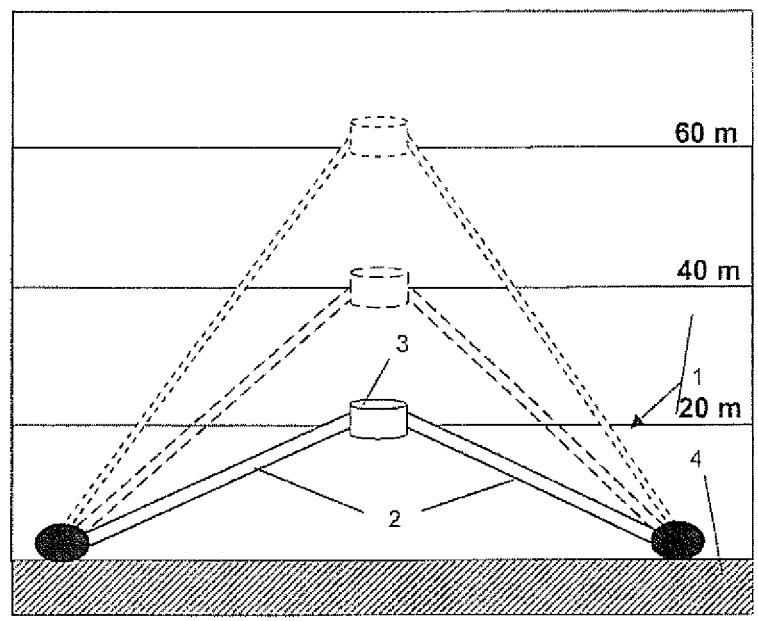
FIG. 25 is schematic representation of a second embodiment of a mooring system according to the present invention.
Figure 26:
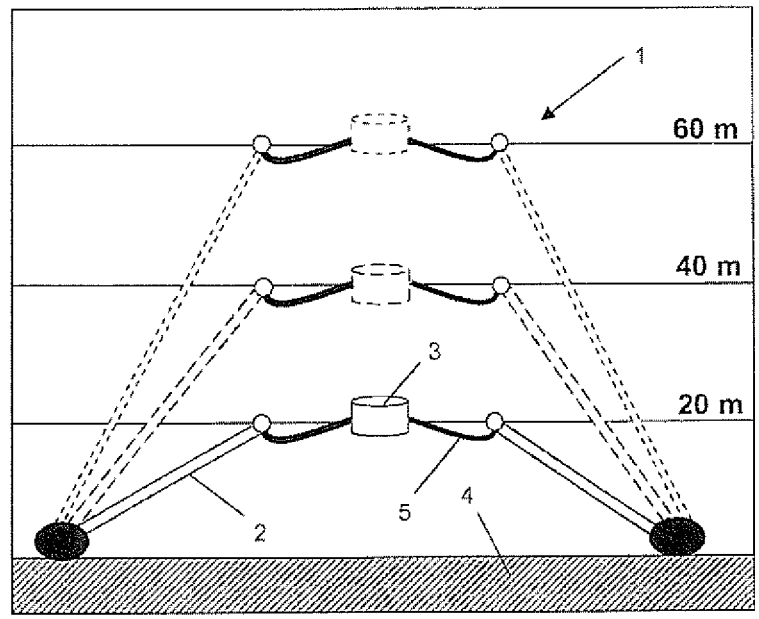
FIG. 26 is schematic representation of a third embodiment of a mooring system according to the present invention.
Figure 27:
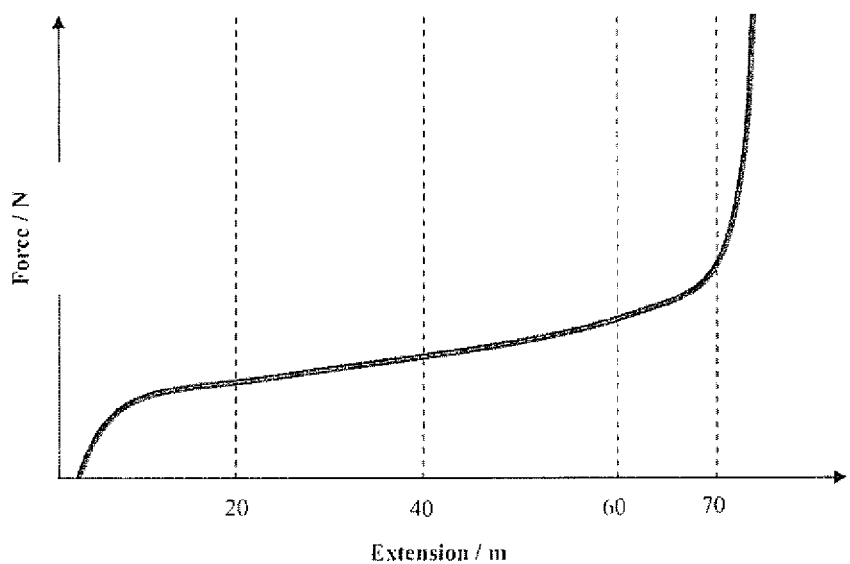
FIG. 27 is a sample composite response curve of a mooring component according to the present invention.

FIGS. 24 to 26 show embodiments of mooring systems 1 according to the present invention. Each system comprises a mooring component 2 according to the invention.

The embodiment shown in FIG. 24 is a taut mooring, in which the mooring component 2 is connected directly between the floating body 3 and the seabed 4. As shown in the drawing, the scope and footprint of the mooring system are minimised.

Alternative embodiments are shown in FIGS. 25 and 26. In FIG. 25, the mooring system 1 comprises a pair of mooring components 2, each of which is connected to the floating body and to the seabed. In FIG. 26, the mooring system comprises a pair of mooring components 2 which are directly connected to the seabed 4 and which are connected to the floating body by means of a line 5.

Figure 28A:
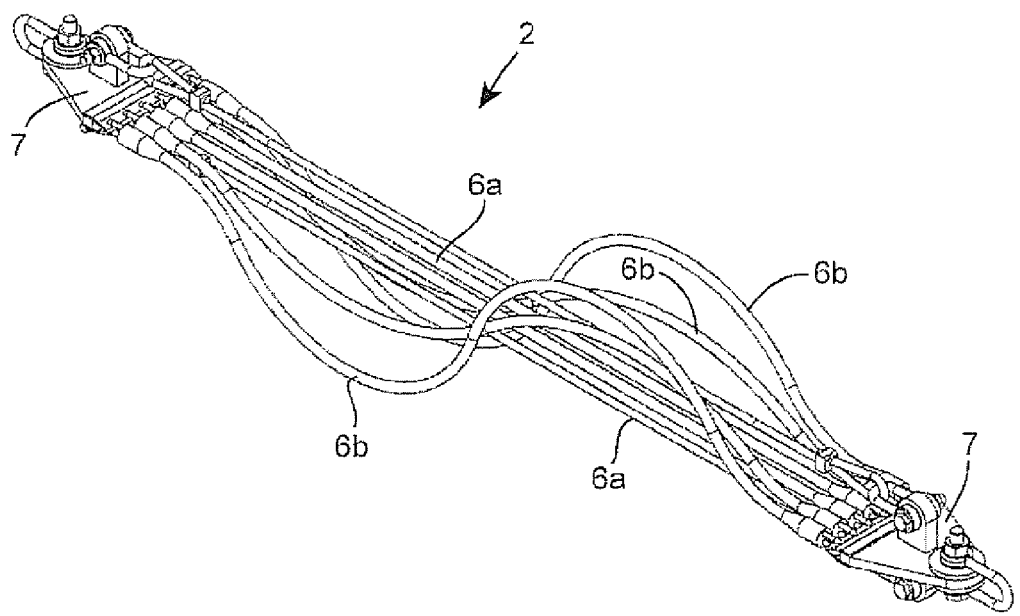
FIG. 28a is a perspective view of a first embodiment of a mooring component according to the present invention, in an unstretched configuration.
Figure 28B:
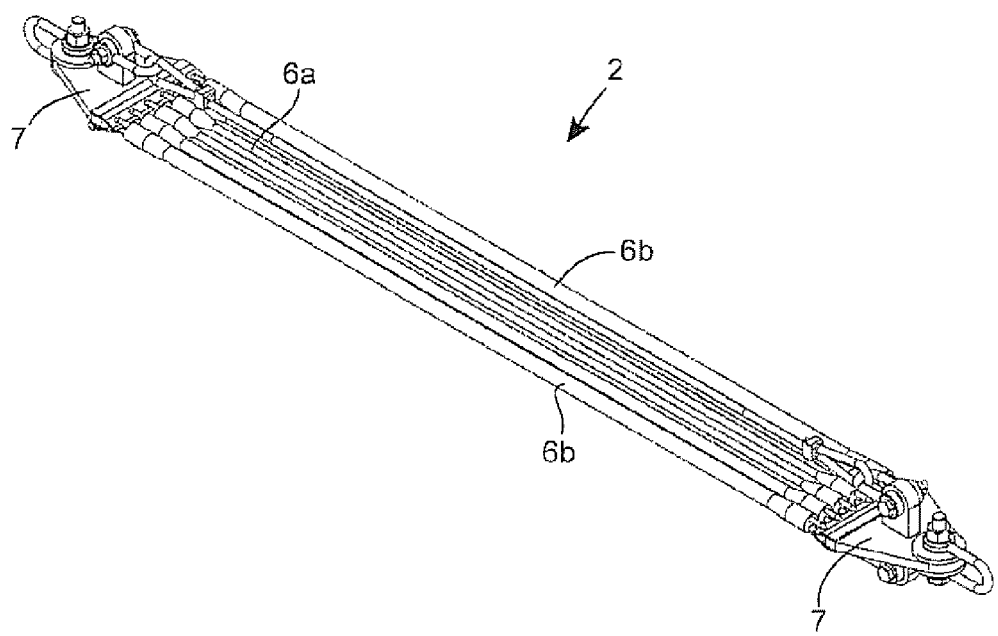
FIG. 28b is a perspective view of the mooring component of FIG. 28a; in a stretched configuration.

As shown in FIGS. 28a and 28b, in one embodiment, the mooring component 2 of the present invention is provided in the form of a hawser. FIG. 28a shows the mooring component 2 in an unstretched configuration. The component 2 comprises a plurality of elongate flexible elements 6. The elements 6 are formed from elastomeric materials and have a variety of lengths, as shown in FIG. 28a. Steel connectors 7 are provided at either end of the component 2, so that the component is connectable between a floating body and the seabed. As shown above, the mooring system 1 may also comprise additional components, so that the connections to the floating body and the seabed may be indirect.

In the embodiment shown, several elements 6a are relatively short, whereas elements 6b are longer. Each of the elements 6 provides an individual stress-strain response, so that the mooring component 2 has a composite stress-strain response, wherein the composite response a combination of the responses of each of the plurality of elements 6a, 6b. The longer elements only begin to stretch at longer extensions so that they have high hysteresis and therefore absorb energy at extreme loads.

Figure 29:
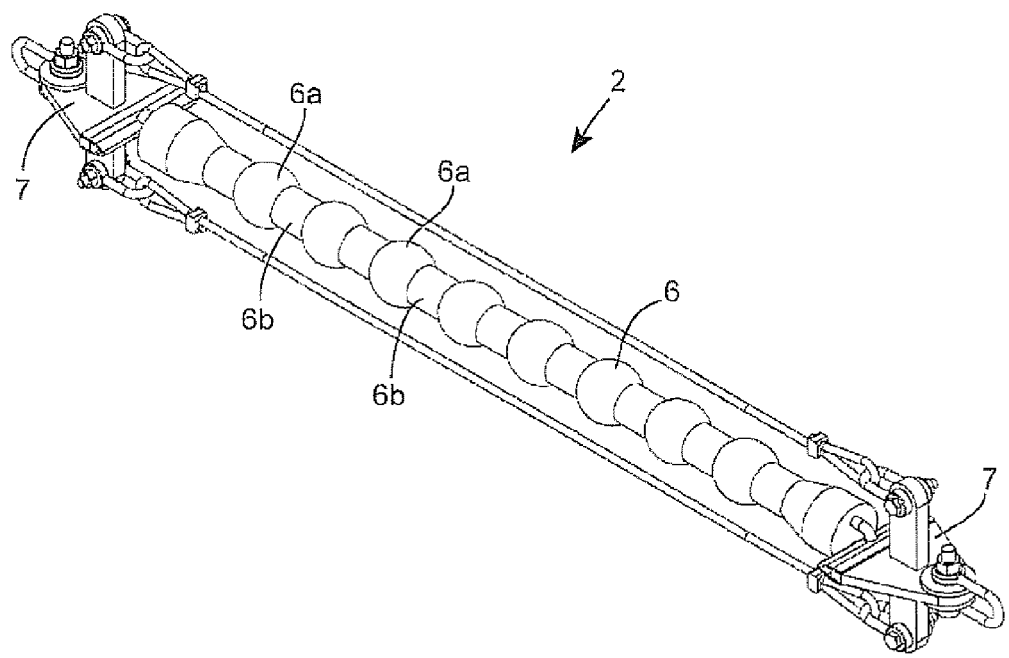
FIG. 29 is a perspective view of a second embodiment of a mooring component according to the present invention.

FIG. 29 shows another embodiment of a mooring component 2 according to the present invention. In this embodiment, the diameter of the elongate flexible element 6 varies along its length, so that the element comprises a plurality of portions 6a, 6b of different diameter and the composite response is a combination of the responses each of the different diameter portions 6a, 6b.

Figure 30:
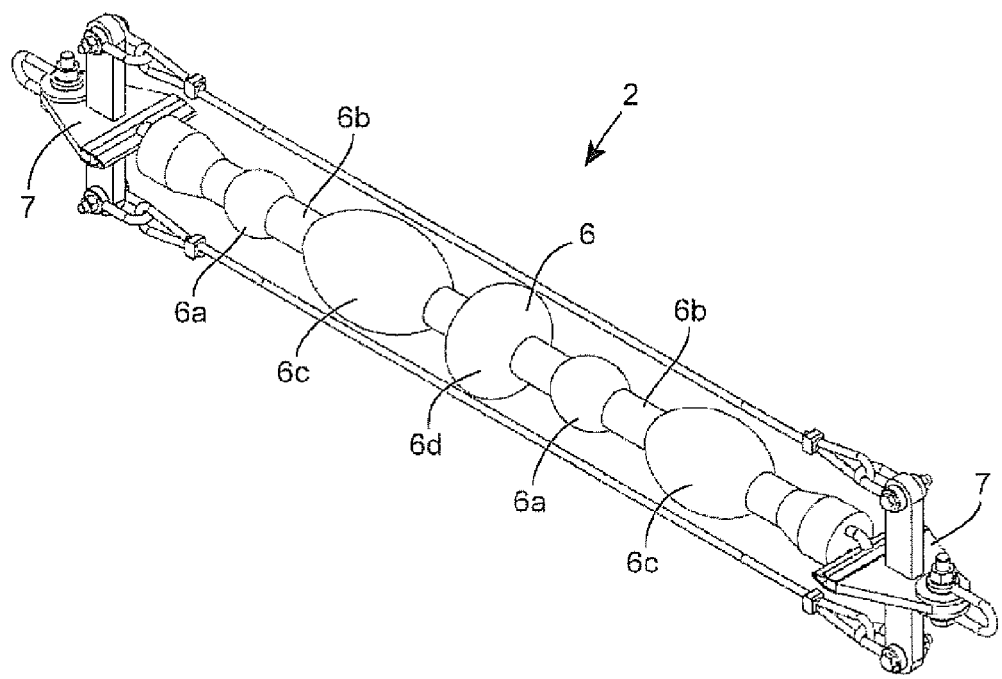
FIG. 30 is a perspective view of a third embodiment of a mooring component according to the present invention.

FIG. 30 shows a further embodiment of a mooring component 2 according to the present invention. In this embodiment, the shape of the elongate flexible element 6 varies along its length, so that the element comprises a plurality of portions 6a, 6b, 6c, 6d of different shape and the composite response is a combination of the responses each of the different portions 6a, 6b, 6c, 6d.

Figure 31:
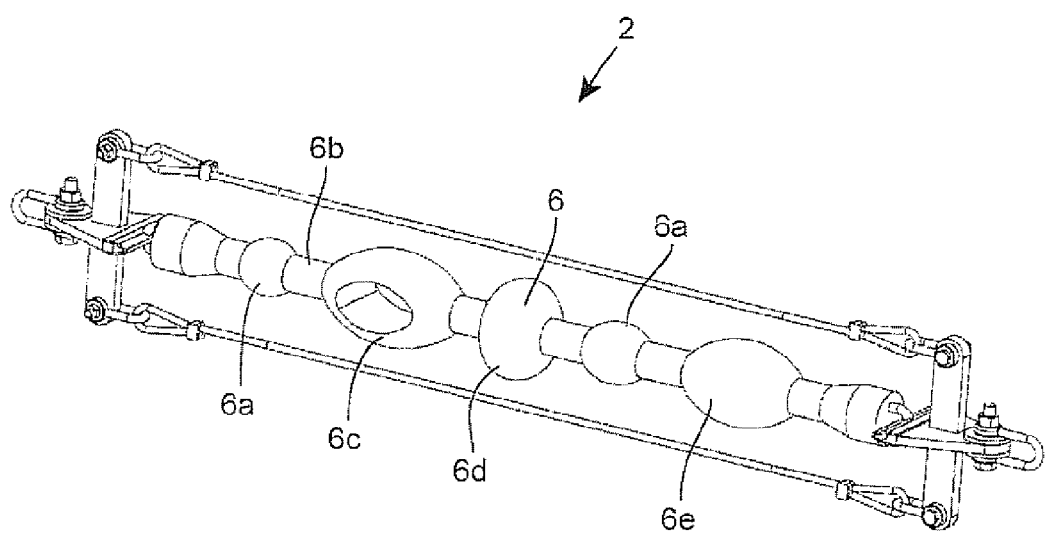
FIG. 31 is a perspective view of a fourth embodiment of a mooring component according to the present invention.

FIG. 31 shows yet another embodiment of a mooring component 2 according to the present invention. In this embodiment, the shape of the elongate flexible element 6 varies along its length, so that the element comprises a plurality of portions 6a, 6b, 6c, 6d, 6e of different shape. In this embodiment, the shape of portion 6c is more complex, in that it is partially hollowed out. The composite response is a combination of the responses each of the different portions 6a, 6b, 6c, 6d, 6e.

Figure 32:
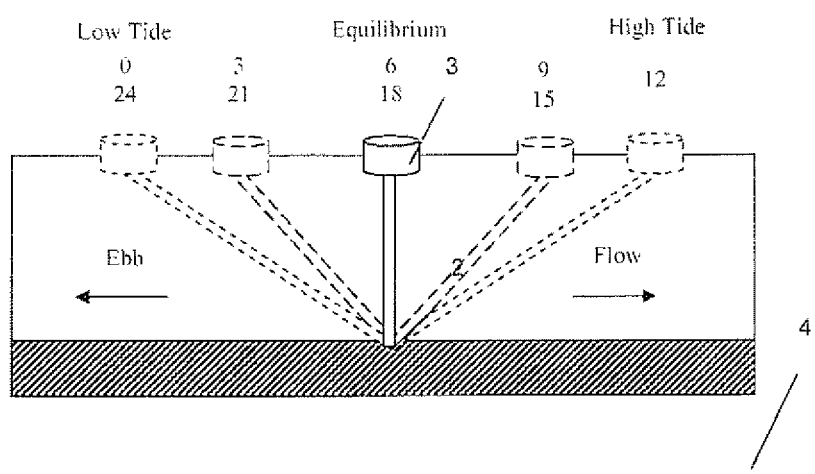
FIG. 32 is schematic representation of an embodiment of a mooring system according to the present invention, adapted for a tidal environment.

FIG. 32 shows that, as the tide flows, the floating body 3 drifts in one direction from equilibrium to a maximum offset point at high tide. Then, as the tide ebbs, the floating body 3 starts to drift back in the opposite direction, past equilibrium to reach a maximum offset at low tide. For example, for a water depth of 5 meters, the floating body may drift to an offset position from equilibrium. The mooring component 2 is capable of controlling the floating body 3 over this horizontal range.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. A damper for damping reactionary motion of a wave energy conversion device to wave motion, comprising:
   a damping energy absorber having a reversible non-linear stress-strain response, arranged to damp the reactionary motion of the wave energy conversion device, wherein the damping energy absorber is passive and has a composite reversible non-linear stress-strain response such that the stress-strain response of the damping energy absorber may be tailored to predicted conditions in which the wave energy conversion device is to be used.

2. A damping structure for a wave energy conversion device, comprising:
   a first member; and
   a damping member having a reversible non-linear stress-strain response;
   wherein the damping member is connectable to the first member and to a second member or float of a wave energy conversion device, wherein the damping member is passive and has a composite reversible non-linear stress-strain response such that the stress-strain response of the damping member may be tailored to predicted conditions in which the wave energy conversion device is to be used.

3. The damping structure of claim 2, wherein the damping member comprises a plurality of elements or portions and the composite response is a combination of the responses of each of the plurality of elements or portions.

4. The structure of claim 2, wherein the first member comprises at least one other wave energy conversion device.

5. The structure of claim 2, wherein the damping member comprises a material having a plurality of bundled strands.

6. The structure of claim 5, wherein the strands are formed from a plurality of different materials, such that the resultant composite material has the desired non-linear stress-strain characteristics.

7. The damping structure of claim 2, comprising a plurality of damping members, wherein each damping member is arranged to damp the movement of the device substantially along a single axis, such that the damping structure provides different stress-strain responses along different axes.

8. The damping structure of claim 2, wherein the first member is a fixed member and the second member is a moveable member or float of the wave energy conversion device.

9. The damping structure of claim 2, wherein the first member and the second member are moveable members of the wave energy conversion device.

10. The damping structure of claim 2, wherein the damping member exerts a low, or zero, counterforce until the applied force or rate of applied force exceeds a threshold.

11. The damping structure of claim 2, wherein the damping member varies in thickness along its length.

12. The damping structure of claim 2, wherein the damping member comprises a plurality of components of different lengths, materials or thicknesses.

13. The damping structure of claim 2, wherein the damping member comprises a rubber or polyurethane material.

14. The damping structure of claim 2, wherein the damping member comprises a composite material.

15. A wave energy conversion device comprising the damping structure of claim 2.

* * * * *